United States Patent
White et al.

(10) Patent No.: US 10,346,049 B2
(45) Date of Patent: Jul. 9, 2019

(54) DISTRIBUTED CONTIGUOUS READS IN A NETWORK ON A CHIP ARCHITECTURE

(71) Applicant: Friday Harbor LLC, New York, NY (US)

(72) Inventors: Andrew White, Austin, TX (US); Douglas B. Meyer, San Diego, CA (US)

(73) Assignee: Friday Harbor LLC, New York, NY (US)

( * ) Notice: Subject to any disclaimer, the term of this patent is extended or adjusted under 35 U.S.C. 154(b) by 0 days.

(21) Appl. No.: 15/143,215

(22) Filed: Apr. 29, 2016

(65) Prior Publication Data
US 2017/0315726 A1    Nov. 2, 2017

(51) Int. Cl.
G06F 3/06    (2006.01)

(52) U.S. Cl.
CPC .............. *G06F 3/061* (2013.01); *G06F 3/067* (2013.01); *G06F 3/0629* (2013.01)

(58) Field of Classification Search
CPC . G06F 3/06; G06F 3/061; G06F 3/067; G06F 3/0629
USPC .................................. 711/147, 100
See application file for complete search history.

(56) References Cited

U.S. PATENT DOCUMENTS

| | | |
|---|---|---|
| 4,797,652 A | 1/1989 | Hall |
| 4,860,201 A | 8/1989 | Stolfo et al. |
| 4,974,169 A | 11/1990 | Engel |
| 5,161,156 A | 11/1992 | Baum et al. |

(Continued)

FOREIGN PATENT DOCUMENTS

| | | |
|---|---|---|
| WO | 1992002866 | 2/1992 |
| WO | 1993020552 | 10/1993 |

(Continued)

OTHER PUBLICATIONS

Eichner et al., "Neural Simulations on Multi-Core Architectures", Frontiers in Neuroinformatics, vol. 3, Article 21, Jul. 2009, pp. 1-15.

(Continued)

*Primary Examiner* — David Yi
*Assistant Examiner* — Zubair Ahmed
(74) *Attorney, Agent, or Firm* — Sheppard Mullin Richter & Hampton LLP

(57) ABSTRACT

Systems and techniques for network on a chip based computer architectures and distributing data without shared pointers therein are described. A described system includes computing resources; and a memory resource configured to maintain a dedicated memory region of the memory resource for distributed read operations requested by the computing resources. The computing resources can generate a packet to fetch data from the dedicated memory region without using memory addresses of respective data elements. The memory resource can receive the first packet, determine whether the first packet indicates the distributed read operation, and determine that the dedicated memory region is non-empty. Further, the memory resource can fetch one or more data elements from the dedicated memory region based on the first packet indicating the distributed read operation and the dedicated memory region being non-empty, and send a packet that includes the one or more fetched data elements.

20 Claims, 15 Drawing Sheets

(56) References Cited

U.S. PATENT DOCUMENTS

| | | | |
|---|---|---|---|
| 5,224,100 A | 6/1993 | Lee et al. | |
| 5,285,524 A | 2/1994 | Cok | |
| 5,325,464 A | 6/1994 | Pechanek et al. | |
| 5,765,200 A * | 6/1998 | McIlvain | G06F 3/0622 |
| | | | 703/24 |
| 6,085,233 A | 7/2000 | Jeffrey et al. | |
| 6,513,108 B1 | 1/2003 | Kerr et al. | |
| 6,735,773 B1 | 5/2004 | Trinh et al. | |
| 6,917,915 B2 | 7/2005 | Du et al. | |
| 6,965,615 B1 | 11/2005 | Kerr et al. | |
| 7,215,637 B1 * | 5/2007 | Ferguson | H04L 45/00 |
| | | | 370/230.1 |
| 7,401,169 B2 | 7/2008 | Holbrook | |
| 7,685,409 B2 | 3/2010 | Du et al. | |
| 7,746,862 B1 | 6/2010 | Zuk et al. | |
| 8,126,828 B2 | 2/2012 | Snook et al. | |
| 8,484,307 B2 | 7/2013 | Arimilli | |
| 8,583,648 B1 | 11/2013 | Majkowska | |
| 8,655,815 B2 | 2/2014 | Palmer et al. | |
| 8,848,726 B1 | 9/2014 | Palmer | |
| 8,954,700 B2 | 2/2015 | Ansari et al. | |
| 9,025,457 B2 * | 5/2015 | Yamaguchi | G06F 1/3206 |
| | | | 370/235 |
| 9,185,057 B2 | 11/2015 | Palmer et al. | |
| 9,294,097 B1 | 3/2016 | Vassiliev | |
| 2002/0073348 A1 | 6/2002 | Tani | |
| 2002/0083297 A1 | 6/2002 | Modelski et al. | |
| 2003/0037194 A1 | 2/2003 | Mukherjee | |
| 2003/0231627 A1 | 12/2003 | John et al. | |
| 2004/0030745 A1 | 2/2004 | Boucher et al. | |
| 2004/0037322 A1 | 2/2004 | Sukonik et al. | |
| 2004/0098490 A1 | 5/2004 | Dinker et al. | |
| 2005/0204058 A1 | 9/2005 | Philbrick et al. | |
| 2006/0010144 A1 | 1/2006 | Lawrence et al. | |
| 2006/0023719 A1 | 2/2006 | Sindhu et al. | |
| 2007/0011118 A1 | 1/2007 | Snook et al. | |
| 2007/0022063 A1 | 1/2007 | Lightowler | |
| 2007/0121499 A1 | 5/2007 | Pal et al. | |
| 2007/0217559 A1 | 9/2007 | Stott | |
| 2007/0296459 A1 | 12/2007 | Kelem | |
| 2008/0077921 A1 | 3/2008 | Chaudhary | |
| 2008/0198706 A1 | 8/2008 | Wu | |
| 2008/0215514 A1 | 9/2008 | Morgan | |
| 2010/0095088 A1 | 4/2010 | Vorbach | |
| 2010/0115236 A1 | 5/2010 | Bataineh | |
| 2010/0161533 A1 | 6/2010 | Snook | |
| 2010/0269027 A1 | 10/2010 | Arimilli et al. | |
| 2010/0312735 A1 | 12/2010 | Knoblauch | |
| 2011/0083000 A1 | 4/2011 | Rhoades et al. | |
| 2011/0161625 A1 | 6/2011 | Pechanek | |
| 2011/0219035 A1 | 9/2011 | Korsunsky et al. | |
| 2011/0261705 A1 | 10/2011 | Karnerkar et al. | |
| 2011/0289034 A1 | 11/2011 | Palmer et al. | |
| 2011/0313961 A1 | 12/2011 | Toscano et al. | |
| 2011/0314233 A1 | 12/2011 | Yan | |
| 2012/0066372 A1 | 3/2012 | Jennings et al. | |
| 2012/0075319 A1 | 3/2012 | Dally | |
| 2012/0177050 A1 | 7/2012 | Fujimoto | |
| 2012/0179896 A1 | 7/2012 | Salapura et al. | |
| 2012/0240185 A1 | 9/2012 | Kapoor et al. | |
| 2012/0320921 A1 | 12/2012 | Barnes et al. | |
| 2013/0242831 A1 | 9/2013 | Vannithamby | |
| 2013/0250954 A1 * | 9/2013 | Sano | H04L 45/06 |
| | | | 370/392 |
| 2014/0032457 A1 | 1/2014 | Palmer et al. | |
| 2014/0068625 A1 | 3/2014 | Winser | |
| 2014/0156907 A1 | 6/2014 | Palmer | |
| 2014/0172763 A1 | 6/2014 | Palmer et al. | |
| 2014/0281429 A1 | 9/2014 | Brown et al. | |
| 2014/0304399 A1 | 10/2014 | Chaudhary et al. | |
| 2014/0310467 A1 | 10/2014 | Shalf et al. | |
| 2014/0317221 A1 | 10/2014 | Froening | |
| 2015/0124805 A1 | 5/2015 | Yadav et al. | |

FOREIGN PATENT DOCUMENTS

| | | |
|---|---|---|
| WO | 2004042570 | 5/2004 |
| WO | 2014062265 | 4/2014 |
| WO | 2014089259 | 6/2014 |

OTHER PUBLICATIONS

Frank et al., "An accelerator for neural networks with Pulse-coded Model Neurons", IEEE Transactions on neural networks, vol. 10, No. 3, May 1996, pp. 527-538.

Kim et al., "Mapping of Neural networks onto the memory-Processor Integrated Architecture", Neural Networks, vol. 11, No. 6, Aug. 1998, pp. 1083-1098.

Pumaprajna et al., "Using run-Time Reconfiguration for Energy Savings in Parallel Data Processing", Proceedings of the International Conference on Engineering of Reconfigurable Systems and Algorithms, Jul. 13, 2009, 7 pages.

Rast et al., Virtual Synaptic Interconnect Using an Asynchronous Network-On-Chip, Proceedings of the 2008 IEEE International Joint Conference on Neural networks, Jun. 1, 2008, pp. 2727-2734.

Schaefer et al., "Simulation of Spiking Neural Networks—Architectures and Implementations", Neurocomputing, vol. 48, 2002, pp. 647-679.

International Application No. PCT/US2016/015483, Notification of Transmittal of the International Search Report and the Written Opinion of the International Searching Authority, dated Apr. 28, 2016, 23 pages.

International Search Report and Written Opinion for International Application No. PCT/US2016/015078, dated May 18, 2016, 11 pages.

* cited by examiner

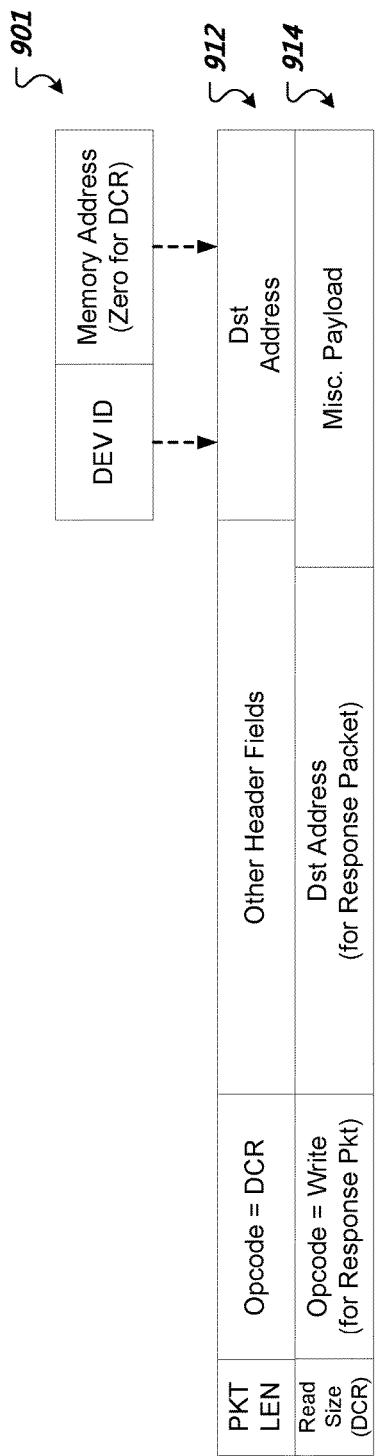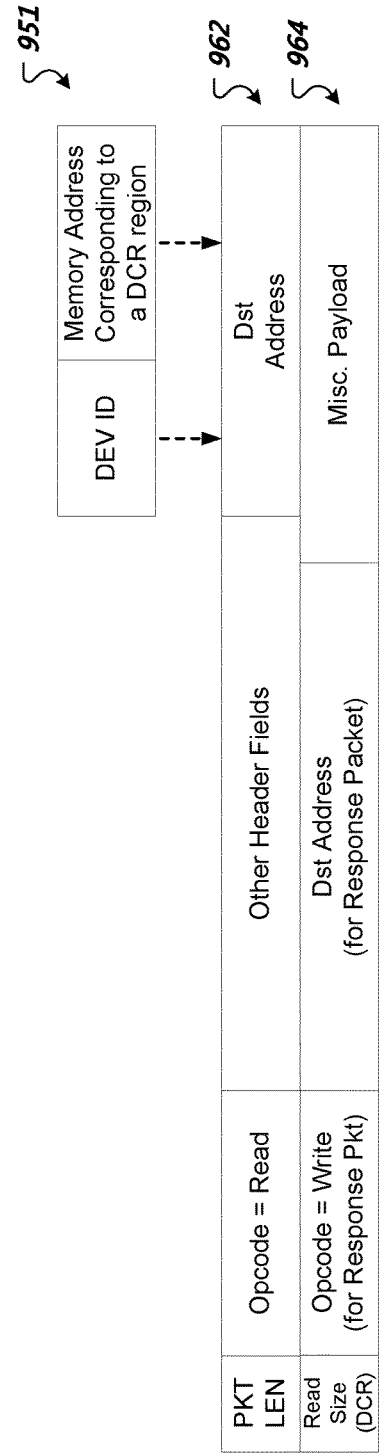
FIG. 9A
FIG. 9B

DISTRIBUTED CONTIGUOUS READS IN A NETWORK ON A CHIP ARCHITECTURE

FIELD OF THE DISCLOSURE

The systems, methods, and apparatuses described herein relate to reading from memory in a computing system that has a plurality of computing resources, where communications among the computing resources are carried out based on a network on a chip architecture.

BACKGROUND

A computing system includes multiple computing resources, at least some of which communicate with each other based on a network on a chip architecture. The computing resources include processing elements (or engines), memories, and the like. Data processed by a processing element can be stored by the processing element, in part remotely, in a memory of the computing system, and, in part locally, in memory registers of the processing element. Often, the processing element combines the items of processed data stored in the memory with the items of processed data stored in the memory registers and then sends the combined processed data items to another processing element for further processing (e.g., as part of a software pipeline).

This is conventionally accomplished by the processing element by performing the following sequence of operations: a first portion of the processed data to be sent to the other processing element is first retrieved from the memory and then placed into memory registers contiguous with the memory registers already holding a second portion of the processed data to be sent to the other processing element. Upon placement of the retrieved first portion of the processed data in the contiguous registers, the processing element transmits the combined processed data to the other processing element for further processing.

SUMMARY

Systems and techniques for network on a chip based computer architectures and communications therein are disclosed. In one aspect of the disclosed technologies, a technique includes maintaining, at a memory resource of a computer system, a dedicated memory region of the memory resource for distributed read operations requested by a plurality of computing resources of the computer system. The technique can include generating, from a first computing resource of the plurality of computing resources, a first packet to fetch data from the dedicated memory region of the memory resource without using memory addresses of respective data elements stored within the dedicated memory region of the memory resource, and sending the first packet from the first computing resource to the memory resource. The first packet can include a destination address that comprises an identifier to route the first packet to the memory resource and an opcode that specifies an operation to be performed by the memory resource, where at least one of the destination address or the opcode indicates a distributed read operation. The technique can include receiving, at the memory resource, the first packet; determining, at the memory resource, whether the first packet indicates the distributed read operation; determining, at the memory resource, that the dedicated memory region is non-empty; fetching one or more data elements from the dedicated memory region based on the first packet indicating the distributed read operation and the dedicated memory region being non-empty; and sending, by the memory resource, a second packet that includes the one or more data elements.

These and other implementations can include one or more of the following features. The memory resource can include a first pointer, a second pointer, and a current read pointer. The first pointer and the second pointer can define an area of a memory structure that corresponds to the dedicated memory region. Fetching the one or more data elements can include fetching the one or more data elements based on the first pointer, the second pointer, and the current read pointer; and advancing the current read pointer such that the one or more data elements will not be fetched again by a subsequent distributed read operation on the dedicated memory region. The memory resource can include a third pointer. Determining whether the dedicated memory region is non-empty can include making a comparison based on the current read pointer and the third pointer. In some implementations, the third pointer is a write pointer that points to the last written data element. The memory resource can modify the current read pointer based on a determination of whether to allow data elements in the dedicated memory region to be read again. Fetching the one or more data elements can include fetching the one or more data elements based on a counter associated with the dedicated memory region; and modifying the counter such that the one or more data elements will not be fetched again by a subsequent distributed read operation on the dedicated memory region.

In some implementations, the memory resource can include a plurality of dedicated memory regions, and wherein the destination address can include information to specify a specific one of the plurality of dedicated memory regions. In some implementations, the first packet can include a read size field. Fetching the one or more data elements can be based on a value of the read size field. Implementations can include causing the one or more data elements to not be fetched again by a subsequent distributed read operation on the dedicated memory region. Causing the one or more data elements to not be fetched again can include modifying a local sync element such as a pointer or a counter. Implementations can include resetting the local sync element such that data elements can be fetched gain. Causing the one or more data elements to not be fetched again can include removing one or more data elements. Implementations can include receiving, at the memory resource, a third packet that indicates a distributed read operation; determining, at the memory resource, that the dedicated memory region is empty; and sending an empty notification packet to a destination computing resource associated with the third packet based on the dedicated memory region being empty. Implementations can include receiving, at the memory resource, a third packet that indicates a distributed read operation; determining, at the memory resource, that the dedicated memory region is empty; and holding the third packet at the memory resource while the dedicated memory region is empty; and servicing the third packet when the dedicated memory region becomes non-empty.

Particular aspects of the disclosed technologies can be implemented so as to realize one or more of the following potential advantages. Multiple computing resources can fetch data elements from a shared source without using a shared pointer or using specific, individual data element memory addresses. Rather than having each of the computing resources deal with synchronization, a memory resource can maintain synchronization such that the data elements are uniquely distributed. Using distributed contiguous reads can improve efficiency of distributed programs, reduce synchronization overhead, and can reduce system complexity.

Details of one or more implementations of the disclosed technologies are set forth in the accompanying drawings and the description below. Other features, aspects, descriptions and potential advantages will become apparent from the description, the drawings, and the claims.

BRIEF DESCRIPTION OF THE DRAWINGS

FIGS. 9A and 9B show different examples of a format of a distributed contiguous read packet.

DETAILED DESCRIPTION

Figure 1:
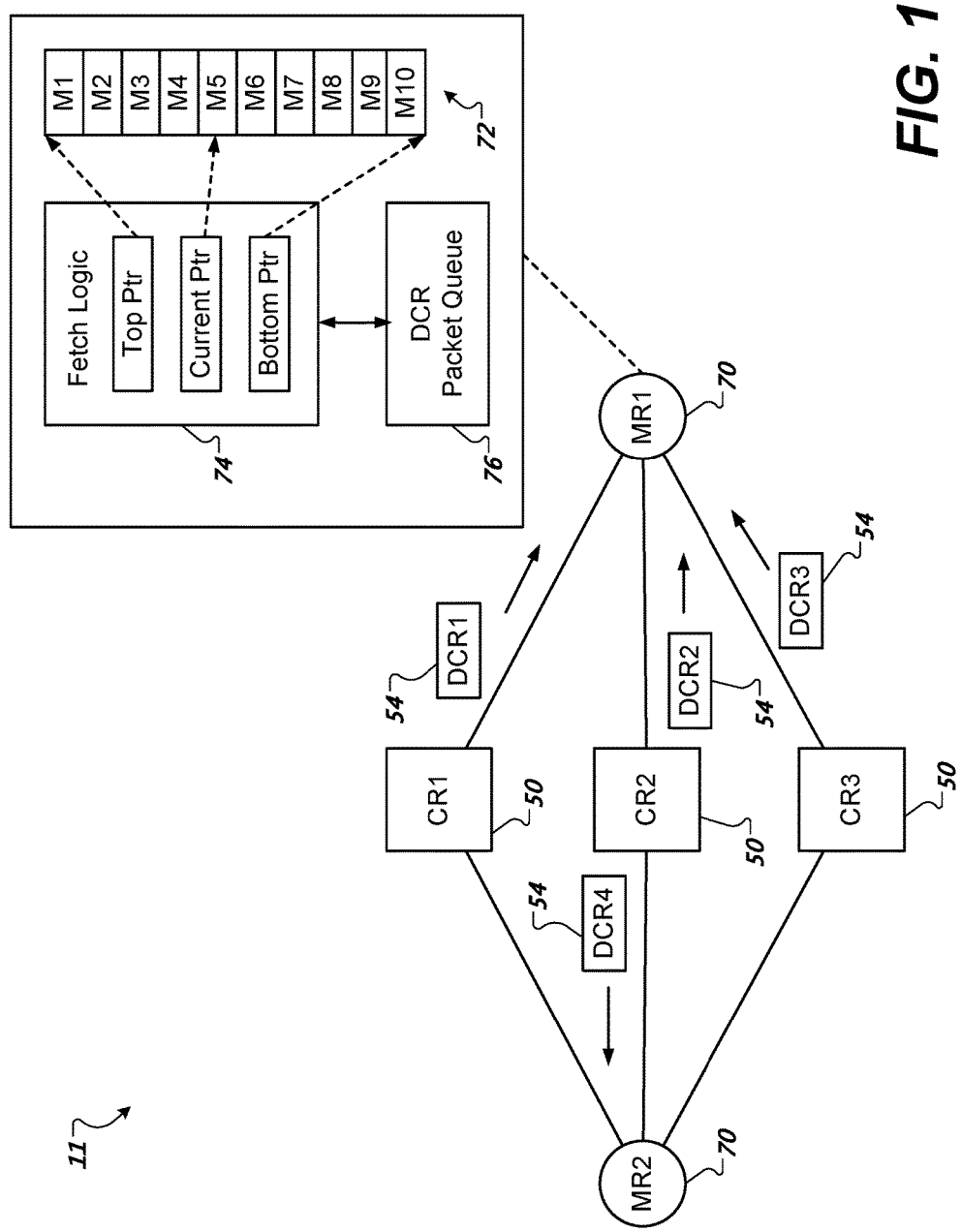
FIG. 1 shows an example of a network on a chip based computer system to handle distributed contiguous read packets.

FIG. 1 shows an example of a network on a chip based computer system 11 to handle distributed contiguous read packets 54. The computer system 11 includes computing resources 50 (labeled CR1, CR2, and CR3) and memory resources 70 (labeled MR1 and MR2). In some implementations, the computing resources 50 and memory resources 70 are formed on a single integrated circuit. The computing resources 50 can include circuitry such as general purpose processors, digital signal processors (DSPs), specialized logic, or a combination thereof. Memory resources 70 can include a memory controller and one or more memory structures, e.g., random access memory, cache memory, or non-volatile memory.

Within the computer system 11, data elements can be distributed by packets. Packets can be exchanged for various reasons including to read data from a remote location, write data to a remote location, and other reasons such as notification and synchronization among the computing resources 50. For example, one computing resource 50 can generate data and send the data via a packet to another computing resource 50 or memory resource 70. In some implementations, the computer system 11 can include one or more routers to route packets among the computing resources 50 and the memory resources 70. In some implementations, the communications among the computing resources 50 and the memory resources 70 are asynchronous.

The computing resources 50 and memory resources 70 can exchange data via packets such as distributed contiguous read (DCR) packets 54. A DCR packet can be referred to as a distributed read packet. A distributed program can use DCRs to distribute a task among various computing resources 50. Two or more computing resources 50, for example, can use DCRs to obtain respective, smaller portions of data stored in a DCR memory region to process locally and write back the results or share the results. A distributed task can include sorting where each of the resources 50 perform sorting on subgroups, string match where each of the resources 50 perform matching on substrings, etc. In some implementations, the distributed task portion size can be uneven to account for different subtask complexities, which can cause some resources to process more data than others. Various other examples of distributed tasks are possible such as image processing and scientific data modeling.

In greater detail, computing resources 50 can be configured to execute different portions of a distributed task using DCR packets 54 to obtain data from one or more DCR memory regions 72 of one or more memory resources 70. For example, a group of data elements that require processing can be stored at a memory resource 70 in a memory region 72 that is dedicated for distributed contiguous read operations. Each of the computing resources 50 can fetch one of more data elements from the group of data elements for processing locally by sending a DCR packet 54 to the memory resource 70. To avoid duplicating work, a synchronization mechanism can be used to ensure that each of the data elements in the group is only distributed to one of the computing resources 50. Rather than having each of the computing resources 50 be responsible for synchronization such as by utilizing a shared memory pointer among all of the computing resources 50, the memory resource 70 can implement a local synchronization technique for the memory region 72.

For synchronization, the memory resource 70 can include a memory structure for the DCR memory region 72, fetch logic 74, and a DCR packet queue 76. The memory resource 70 can store received DCR packets 54 in the DCR packet queue 76. The fetch logic 74 can extract a packet from the packet queue 76, and fetch one or more data elements from the memory based on a set of pointers, and update the set of pointers such that the same one or more data elements will not be fetched again. The set of pointers can include a top pointer that points to a starting location of the DCR memory region 72, a bottom pointer that points to an ending location of the DCR memory region 72, and a current read pointer.

Based on a received DCR packet 54 extracted from the DCR packet queue 76, the fetch logic 74 can fetch one or more elements from the memory region 72 based on the current pointer and send the elements to a response destination specified by the DCR packet 54. Before fetching, the fetch logic 74 can determine whether the DCR memory region 72 is non-empty, e.g., whether there are one or more valid data elements in the DCR memory region 72. The fetch logic 74 can advance the current pointer after each fetch. If the current pointer reaches the location specified by the bottom pointer, the fetch logic 74 can cause the current pointer to wrap around to the location specified by the top pointer. In some implementations, if the current pointer reaches the location specified by the bottom pointer, the fetch logic 74 can send a notification to signal a lack of data elements for fetching purposes. As discussed in more details below, multiple techniques including the aforementioned pointer-based technique can be used to implement synchronization for DCR based operations.

Figure 2A:
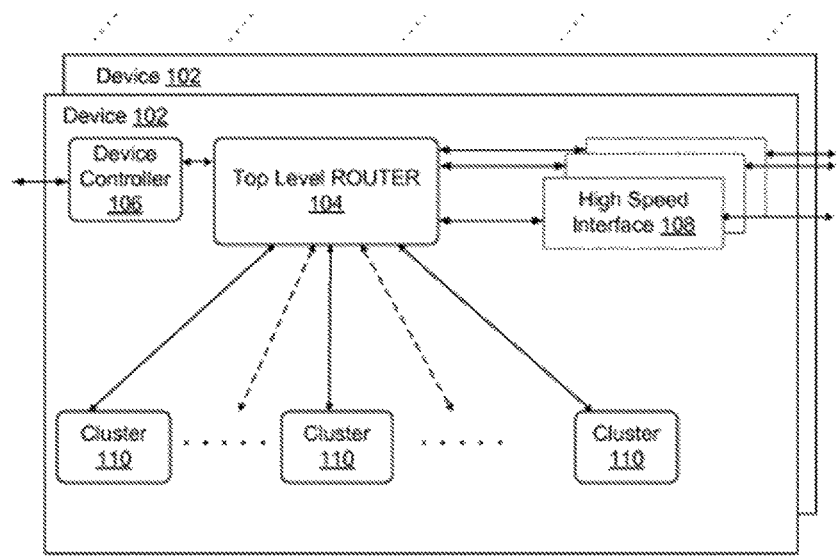
FIGS. 2A and 2B show a block diagram of different examples of a computing system.

FIG. 2A shows a block diagram of an example of a computing system 200. The computing system 200 includes computing resources such as processing devices 102. In some implementations, each processing device 102, which may also be referred to as device 102, includes a router 104, a device controller 106, a plurality of high speed interfaces 108 and a plurality of clusters 110. The router 104 may also be referred to as a top level router or a level one router. Each cluster 110 includes computing resources such as a plurality of processing engines to provide computational capabilities for the computing system 200. In some implementations, the high speed interfaces 108 include communication ports to communicate data outside of the device 102, for example, to other devices 102 of the computing system 200 and/or interfaces to other computing systems. Unless specifically expressed otherwise, data as used herein may refer to both program code and pieces of information upon which the program code operates.

In some implementations, the processing device 102 includes 2, 4, 8, 16, 32 or another number of high speed interfaces 108. Each high speed interface 108 may implement a physical communication protocol. For example, each high speed interface 108 implements the media access control (MAC) protocol, and thus may have a unique MAC address associated with it. The physical communication may be implemented in a known communication technology, for example, Gigabit Ethernet, or any other existing or future-developed communication technology. For example, each high speed interface 108 implements bi-directional high-speed serial ports, such as 10 Gigabits per second (Gbps) serial ports. Two processing devices 102 implementing such high speed interfaces 108 may be directly coupled via one pair or multiple pairs of the high speed interfaces 108, with each pair including one high speed interface 108 on one processing device 102 and another high speed interface 108 on the other processing device 102.

In accordance with a network on a chip architecture, data communication among different computing resources of the computing system 200 is implemented using routable packets. A packet can include a header. A packet can further include a payload following the header. A packet header can include a routable destination address for the packet. The computing resources can include device level resources such as a device controller 106, cluster level resources such as a cluster controller or cluster memory controller, and/or the processing engine level resources such as individual processing engines and/or individual processing engine memory controllers. The router 104 may be a top-most router configured to route packets on each processing device 102. In some implementations, the router 104 is a programmable router. That is, the routing information used by the router 104 may be programmed and updated. In some cases, the router 104 is implemented using an address resolution table (ART) or look-up table (LUT) to route any packet it receives on the high speed interfaces 108, or any of the internal interfaces interfacing the device controller 106 or clusters 110. For example, depending on the destination address, a packet received from one cluster 110 may be routed to a different cluster 110 on the same processing device 102, or to a different processing device 102; and a packet received from one high speed interface 108 may be routed to a cluster 110 on the processing device or to a different processing device 102.

In some implementations, the device controller 106 controls the operation of the processing device 102 from power on through power down. In some implementations, the device controller 106 includes a device controller processor, one or more registers and a device controller memory space. The device controller processor may be any existing or future-developed microcontroller. In some implementations, for example, an ARM® Cortex M0 microcontroller is used for its small footprint and low power consumption. In other implementations, a bigger and more powerful microcontroller is chosen if needed. The one or more registers include one to hold a device identifier (DEVID) for the processing device 102 after the processing device 102 is powered up. The DEVID is used to uniquely identify the processing device 102 in the computing system 200. In some implementations, the DEVID is loaded on system start from a non-volatile storage, for example, a non-volatile internal storage on the processing device 102 or a non-volatile external storage. The device controller memory space may include both read-only memory (ROM) and random access memory (RAM). In some implementations, the ROM may store bootloader code that during a system start is executed to initialize the processing device 102 and load the remainder of the boot code through a bus from outside of the device controller 106. In some implementations, the instructions for the device controller processor, also referred to as the firmware, reside in the RAM after they are loaded during the system start.

Here, the registers and device controller memory space of the device controller 106 are read and written to by computing resources of the computing system 200 using packets. That is, they are addressable using packets. As used herein, the term "memory" may refer to RAM, SRAM, DRAM, eDRAM, SDRAM, volatile memory, non-volatile memory, and/or other types of electronic memory. For example, the header of a packet includes a destination address such as DEVID:PADDR, of which the DEVID may identify the processing device 102 and the PADDR may be an address for a register of the device controller 106 or a memory location of the device controller memory space of a processing device 102. In some implementations, a packet directed to the device controller 106 has a packet operation code, which may be referred to as packet opcode or just opcode, to indicate what operation needs to be performed for the packet. For example, the packet operation code may indicate reading from or writing to the storage location pointed to by PADDR. It should be noted that the device controller 106 also sends packets in addition to receiving them. The packets sent by the device controller 106 may be self-initiated or in response to a received packet (e.g., a read request). Self-initiated packets include, for example, reporting status information, requesting data, etc.

Figure 2B:
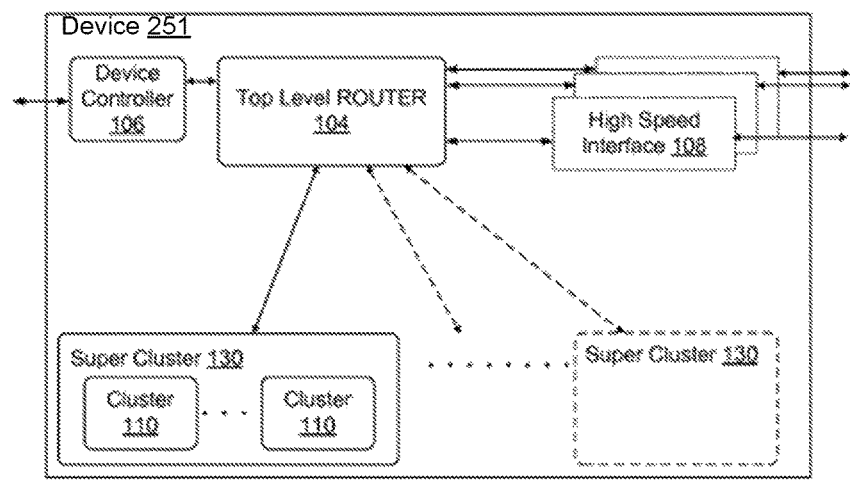

FIG. 2B shows a block diagram of an example of a computing system 250 having a group of clusters 110 on a processing device 251 that are grouped together into super clusters 130. The processing device 251 can include a device controller 106, a router 104, high speed interface 108, and a plurality of clusters 110. The clusters 110 can be grouped together to form a super cluster 130. In this example, the processing device 251 includes a plurality of such super clusters 130. In some implementations, a processing device 251 may include 2, 4, 8, 16, 32 or another number of super clusters 130 and each super cluster 130 may comprise a plurality of clusters.

Figure 3A:
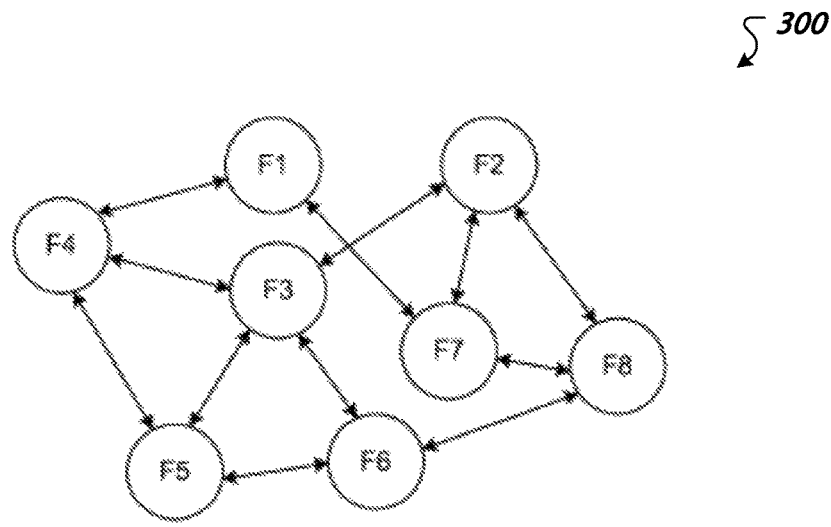
FIGS. 3A and 3B show a topology of different examples of a computing system.

FIG. 3A shows a topology of an example of a computing system 300. The computing system 300 includes a plurality of processing devices 102 designated as F1, F2, F3, F4, F5, F6, F7 and F8. As shown in FIG. 3A, each processing device 102 is directly coupled to one or more other processing devices 102. For example, F4 is directly coupled to F1, F3 and F5; and F7 is directly coupled to F1, F2 and F8. Within computing system 300, one of the processing devices 102 may function as a host for the whole computing system 300. In some implementations, the host has a unique device ID that every processing devices 102 in the computing system 300 recognizes as the host. Any of the processing devices 102 may be designated as the host for the computing system 300. For example, F1 may be designated as the host and the device ID for F1 is set as the unique device ID for the host. In some implementations, the host is a processing device of a different type. The host can communicate with the rest of the system 300 through a communication interface, which represents itself to the rest of the system 300 as the host by having a device ID for the host.

The computing system 300 may implement any appropriate techniques to set the DEVIDs, including the unique DEVID for the host, to the respective processing devices 102 of the computing system 300. In some implementations, the DEVIDs are stored in the ROM of the respective device controller 106 for each processing devices 102 and loaded into a register for the device controller 106 at power up. In other implementations, the DEVIDs are loaded from an external storage. Here, the assignments of DEVIDs may be performed offline (when there is no application running in the computing system 300), and may be changed offline from time to time or as appropriate. Thus, the DEVIDs for one or more processing devices 102 may be different each time the computing system 300 initializes. Moreover, the DEVIDs stored in the registers for each device controller 106 may be changed at runtime. This runtime change is controlled by the host of the computing system 300. For example, after the initialization of the computing system 300, which loads the pre-configured DEVIDs from ROM or external storage, the host of the computing system 300 may reconfigure the computing system 300 and assign different DEVIDs to the processing devices 102 in the computing system 300 to overwrite the initial DEVIDs in the registers of the device controllers 106.

Figure 3B:
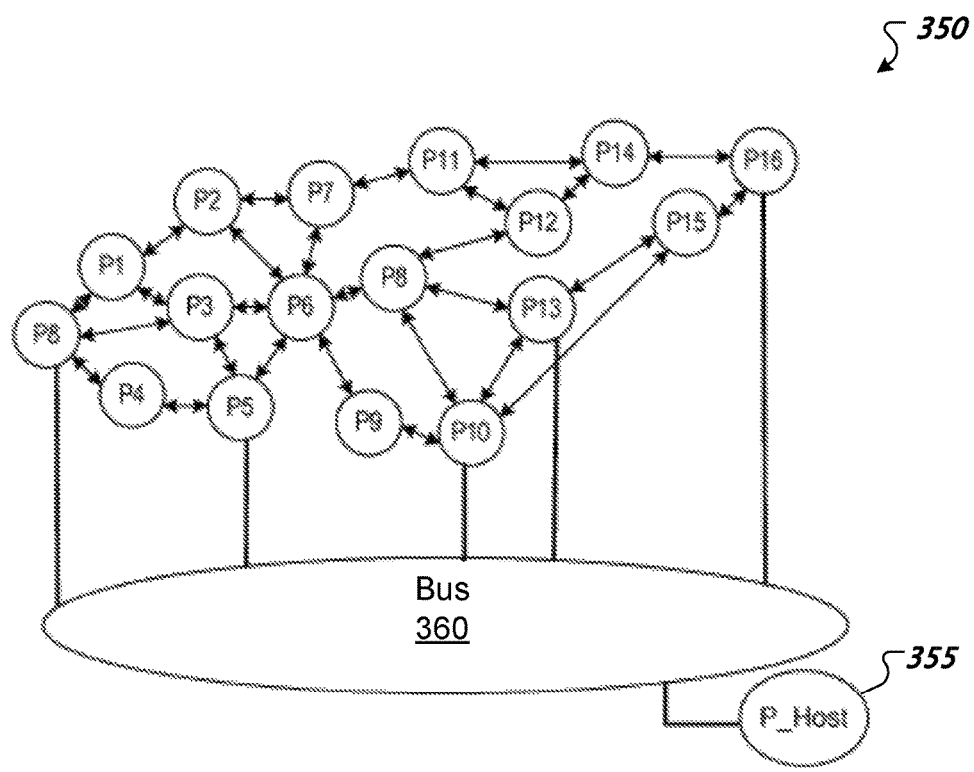

FIG. 3B shows a topology of another example of a computing system 350. The computing system 350 includes a plurality of processing devices 102 (designated as P1 through P16), a bus 360 and a host processing device 355. Each processing device of P1 through P16 is directly coupled to another processing device of P1 through P16 by a direct link between them. At least one of the processing devices P1 through P16 is coupled to the bus 360. In the example shown in FIG. 3B, the processing devices P8, P5, P10, P13, P15 and P16 are coupled to the bus 360. Here, the host processing device 355 is coupled to the bus 360 and is designated as the host for the computing system 350. In the computing system 350, the host processing device 355 may be a computer processor (for example, an ARM® Cortex or Intel® x86 processor). The host processing device communicates with the rest of the computing system 350 through a communication interface coupled to the bus and represents itself to the rest of the system 350 as the host by having a device ID for the host.

Figure 4:
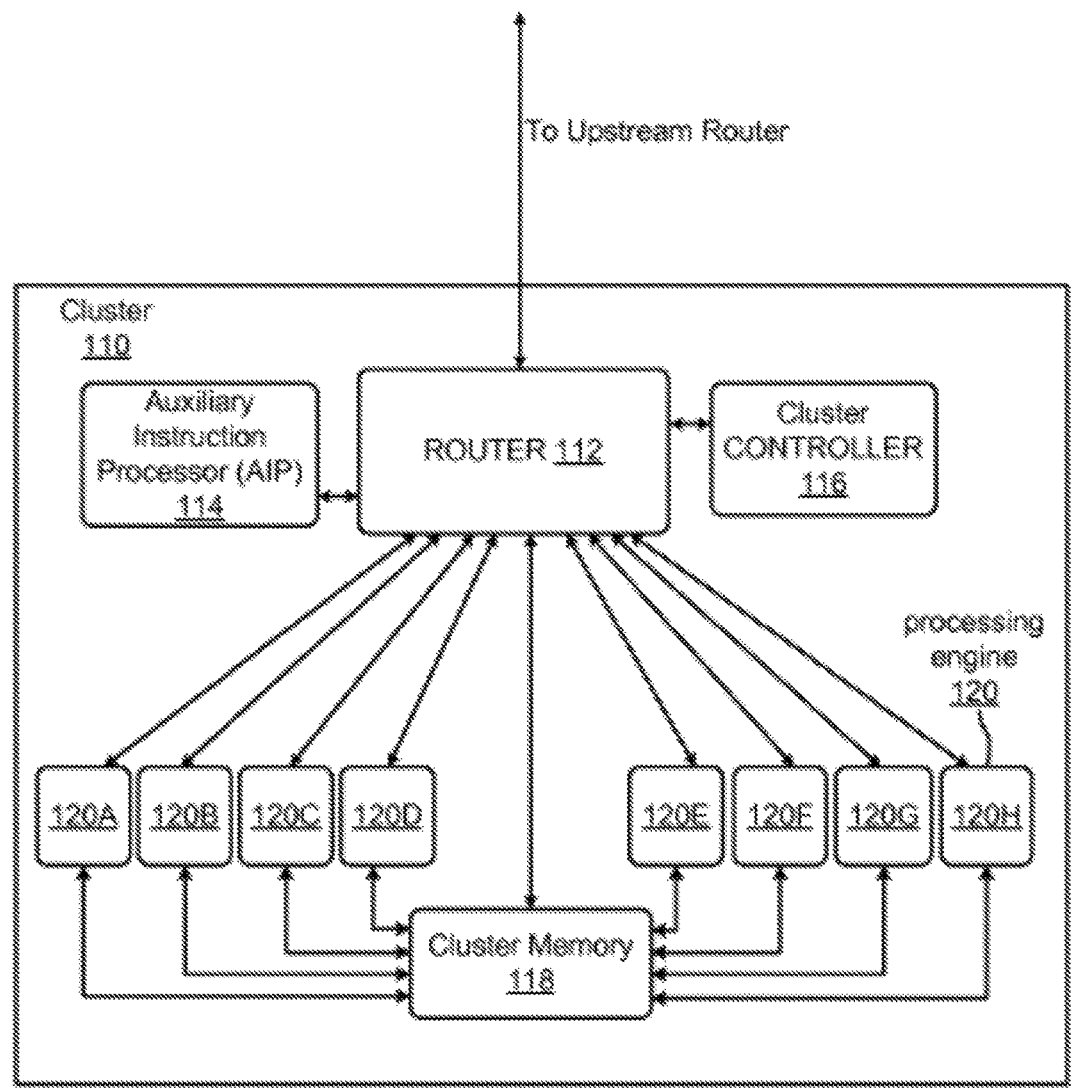
FIG. 4 shows a block diagram of an example of a cluster of the processing device of FIG. 2A.

FIG. 4 shows a block diagram of an example of a cluster 110 of the processing device 102 of FIG. 2A. The cluster 110 includes a router 112, a cluster controller 116, an auxiliary instruction processor (AIP) 114, a memory resource such as a cluster memory 118, and a plurality of processing engines 120. The router 112 is coupled to an upstream router to provide interconnection between the upstream router and the cluster 110. The upstream router may be, for example, the router 104 of the processing device 102 if the cluster 110 is not part of a super cluster 130.

In accordance with network on a chip architecture, examples of operations to be performed by the router 112 include receiving a packet destined for a computing resource within the cluster 110 from outside the cluster 110 and/or transmitting a packet originating within the cluster 110 destined for a computing resource inside or outside the cluster 110. A computing resource within the cluster 110 may be, for example, the cluster memory 118 or any of the processing engines 120 within the cluster 110. A computing resource outside the cluster 110 may be, for example, a computing resource in another cluster 110 of the processing device 102, the device controller 106 of the processing device 102, or a computing resource on another processing device 102. In some implementations, the router 112 also transmits a packet to the router 104 even if the packet may target a resource within itself. In some cases, the router 104 implements a loopback path to send the packet back to the originating cluster 110 if the destination resource is within the cluster 110.

In some implementations, the cluster controller 116 sends packets, for example, as a response to a read request, or as unsolicited data sent by hardware for error or status report. The cluster controller 116 also receives packets, for example, packets with opcodes to read or write data. In some implementations, the cluster controller 116 is a microcontroller, for example, one of the ARM® Cortex-M microcontrollers and includes one or more cluster control registers (CCRs) that provide configuration and control of the cluster 110. In other implementations, instead of using a microcontroller, the cluster controller 116 is custom made to implement any functionalities for handling packets and controlling operation of the router 112. Here, the functionalities may be referred to as custom logic and may be implemented, for example, by FPGA or other specialized circuitry. Regardless of whether it is a microcontroller or implemented by custom logic, the cluster controller 116 may implement a fixed-purpose state machine encapsulating packets and memory access to the CCRs.

In some implementations, each cluster memory 118 is part of the overall addressable memory of the computing system 200. That is, the addressable memory of the computing system 200 includes the cluster memories 118 of all clusters of all devices 102 of the computing system 200. The cluster memory 118 is a part of the main memory shared by the computing system 200. In some implementations, any memory location within the cluster memory 118 may be addressed by any processing engine within the computing system 200 by a physical address. In some implementations, the physical address is a combination of the DEVID, a cluster identifier (CLSID) and a physical address location (PADDR) within the cluster memory 118. As such, the physical address is formed as a string of bits, e.g., DEVID:CLSID:PADDR. The DEVID may be associated with the device controller 106 as described above and the CLSID may be a unique identifier to uniquely identify the cluster 110 within the local processing device 102. It should be noted that in at least some implementations, each register of the cluster controller 116 also be assigned a physical address (PADDR). Therefore, the physical address DEVID:CLSID: PADDR may also be used to address a register of the cluster controller 116, in which PADDR may be an address assigned to the register of the cluster controller 116.

In some other implementations, any memory location within the cluster memory 118 is addressed by any processing engine within the computing system 200 by a virtual address. The virtual address may be a combination of a DEVID, a CLSID and a virtual address location (ADDR). As such, the virtual address is formed as a string of bits, e.g., DEVID:CLSID:ADDR. The DEVID and CLSID in the virtual address may be the same as in the physical addresses.

In some cases, the width of ADDR is specified by system configuration. For example, the width of ADDR is loaded into a storage location convenient to the cluster memory 118 during system start and/or changed from time to time when the computing system 200 performs a system configuration. In some implementations, to convert the virtual address to a physical address, the value of ADDR is added to a base physical address value (BASE). The BASE may also be specified by system configuration as the width of ADDR and stored in a location convenient to a memory controller of the cluster memory 118. In one example, the width of ADDR is stored in a first register and the BASE is stored in a second register in the memory controller. Thus, the virtual address DEVID:CLSID:ADDR is converted to a physical address as DEVID:CLSID:ADDR+BASE. Note that the result of ADDR+BASE has the same width as the target physical address.

The address in the computing system 200 may be 8 bits, 16 bits, 32 bits, 64 bits, or any other number of bits wide. In some implementations, the address is 32 bits wide. The DEVID may be 10, 15, 20, 25 or any other number of bits wide. The width of the DEVID is chosen based on the size of the computing system 200, for example, how many processing devices 102 the computing system 200 has or is designed to have. In some implementations, the DEVID is 20 bits wide and the computing system 200 using this width of DEVID contains up to $2^{20}$ processing devices 102. The width of the CLSID is chosen based on how many clusters 110 the processing device 102 is designed to have. For example, the CLSID may be 3, 4, 5, 6, 7, 8 bits or any other number of bits wide. In some implementations, the CLSID is 5 bits wide and the processing device 102 using this width of CLSID contains up to $2^5$ clusters. The width of the PADDR for the cluster level may be 20, 30 or any other number of bits. For example, the PADDR for the cluster level is 27 bits and the cluster 110 using this width of PADDR contains up to $2^{27}$ memory locations and/or addressable registers. Therefore, in some implementations, if the DEVID is 20 bits wide, CLSID is 5 bits and PADDR has a width of 27 bits, then a physical address DEVID:CLSID:PADDR or DEVID:CLSID:ADDR+BASE is 52 bits.

For performing the virtual to physical memory conversion, the first register (ADDR register) may have 4, 5, 6, 7 bits or any other number of bits. In some implementations, the first register is 5 bits wide. If the value of the 5 bits register is four (4), the width of ADDR is 4 bits; and if the value of 5 bits register is eight (8), the width of ADDR will be 8 bits. Regardless of ADDR being 4 bits or 8 bits wide, if the PADDR for the cluster level is 27 bits, then BASE is 27 bits, and the result of ADDR+BASE still is a 27 bits physical address within the cluster memory 118.

In the example illustrated in FIG. 4, a cluster 110 includes one cluster memory 118. In other examples, a cluster 110 includes a plurality of cluster memories 118 that each includes a memory controller and a plurality of memory banks, respectively. Moreover, in yet another example, a cluster 110 includes a plurality of cluster memories 118 and these cluster memories 118 are connected together via a router that are downstream of the router 112.

The AIP 114 is a special processing engine shared by all processing engines 120 of one cluster 110. In some implementations, the AIP 114 is implemented as a coprocessor to the processing engines 120. For example, the AIP 114 implements less commonly used instructions such as some floating point arithmetic, including but not limited to, one or more of addition, subtraction, multiplication, division and square root, etc. In the example shown in FIG. 4, the AIP 114 is coupled to the router 112 directly and is configured to send and receive packets via the router 112. As a coprocessor to the processing engines 120 within the same cluster 110, although not shown in FIG. 4, the AIP 114 may also be coupled to each processing engines 120 within the same cluster 110 directly. In other implementations, a bus shared by all the processing engines 120 within the same cluster 110 is used for communication between the AIP 114 and all the processing engines 120 within the same cluster 110. In some other implementations, a multiplexer is used to control access to the bus shared by all the processing engines 120 within the same cluster 110 for communication with the AIP 114. In yet other implementations, a multiplexer is used to control communication between the AIP 114 and all the processing engines 120 within the same cluster 110.

Figure 5:
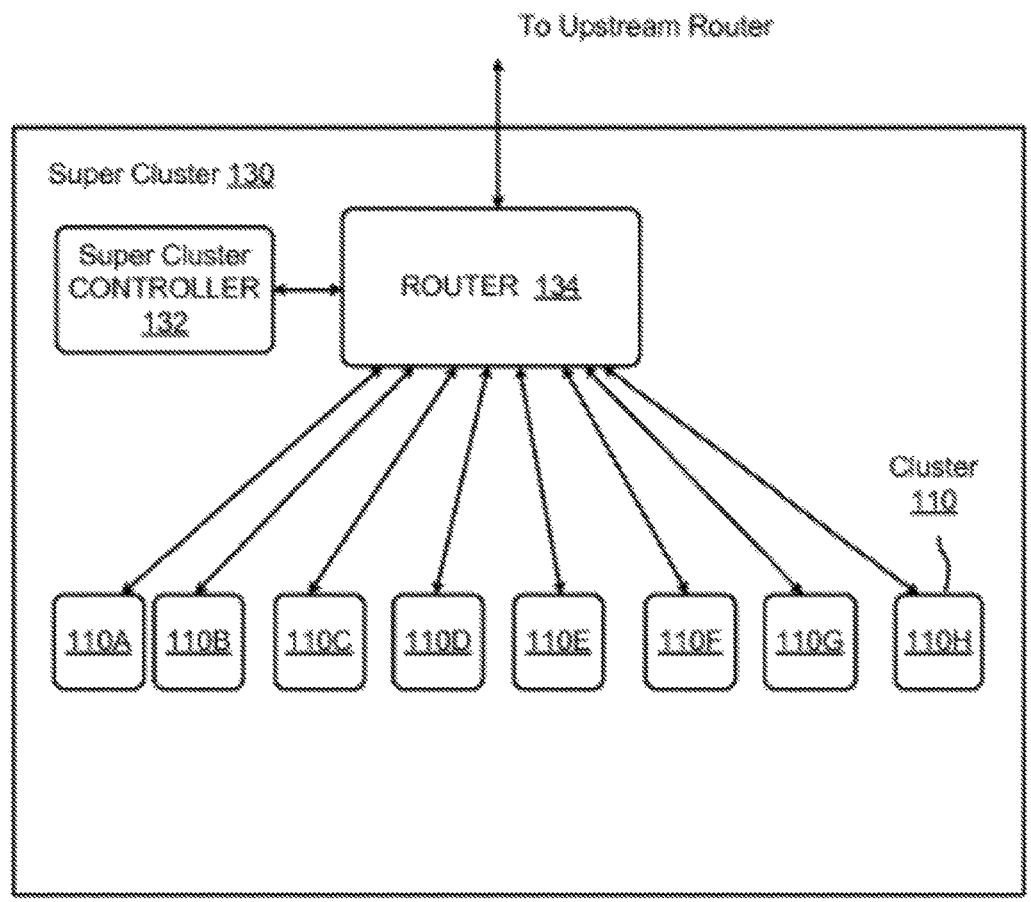
FIG. 5 shows a block diagram of an example of a super cluster of the processing device of FIG. 2B.

FIG. 5 shows a block diagram of an example of a super cluster 130 of the processing device 251 of FIG. 2B. The grouping of the processing engines 120 on a processing device 251 may have a hierarchy with multiple levels. For example, multiple clusters 110 are grouped together to form a super cluster. In the example shown in FIG. 5, a plurality of clusters 110A through 110H are grouped into the super cluster 130. Although 8 clusters are shown in the super cluster 130 on FIG. 5, the super cluster 130 may include 2, 4, 8, 16, 32 or another number of clusters 110. The super cluster 130 includes a router 134 and a super cluster controller 132, in addition to the plurality of clusters 110. The router 134 is configured to route packets among the clusters 110 and the super cluster controller 132 within the super cluster 130, and to and from computing resources outside the super cluster 130 via a link to an upstream router. In implementations in which the super cluster 130 is used in a processing device 251, the upstream router for the router 134 is the top level router 104 of the processing device 251 and the router 134 is an upstream router for the router 112 within the cluster 110. In some implementations, the super cluster controller 132 may be configured to implement CCRs, receive and send packets, and implement a fixed-purpose state machine encapsulating packets and memory access to the CCRs. In some cases, the super cluster controller 132 is implemented similar to the way the cluster controller 116 is implemented in a cluster 110. In other implementations, the super cluster 130 is implemented with just the router 134 and does not have a super cluster controller 132. Grouping of processing engines is not limited to clusters or super clusters. In some implementations, more than two levels of grouping is implemented and each level has its own router and controller.

Figure 6:
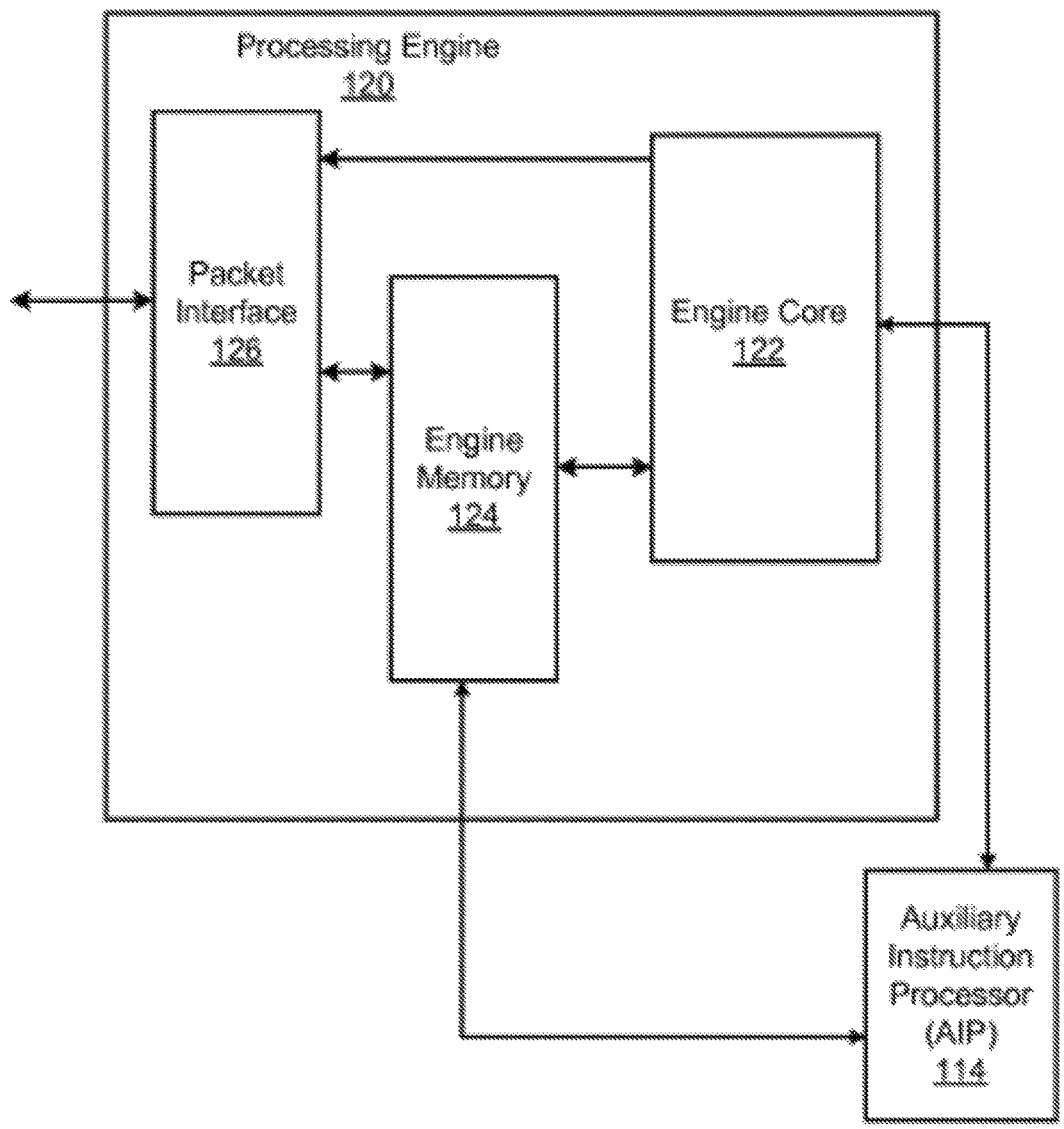
FIG. 6 shows a block diagram of an example of a processing engine of a processing device.

FIG. 6 shows a block diagram of an example of a processing engine 120 of a processing device. A computing resource such as a processing engine 120 can include an engine core 122, an engine memory 124, and a packet interface 126. The processing engine 120 can be directly coupled to an AIP 114. As described above, the AIP 114 may be shared by all processing engines 120 within a cluster 110. In some implementations, the engine core 122 includes a central processing unit (CPU) with an instruction set and implements some or all features of modern CPUs, such as, for example, a multi-stage instruction pipeline, one or more arithmetic logic units (ALUs), one or more floating point units (FPUs) or any other CPU technology. The instruction set includes one instruction set for the ALU to perform arithmetic and logic operations, and another instruction set for the FPU to perform floating point operations. In some cases, the FPU is a completely separate execution unit containing a multi-stage, single-precision floating point pipeline. When an FPU instruction reaches the instruction pipeline of the processing engine 120, the instruction and its source operand(s) are dispatched to the FPU.

The instructions of the instruction set may implement the arithmetic and logic operations and the floating point operations, such as those in the INTEL® x86 instruction set, using a syntax similar or different from the x86 instructions. In some implementations, the instruction set includes customized instructions. For example, one or more instructions are implemented according to the features of the computing system 200 and in accordance with network on a chip architecture. In one example, one or more instructions cause the processing engine executing the instructions to generate packets directly with system wide addressing. In another example, one or more instructions have a memory address located anywhere in the computing system 200 as an operand. In the latter example, a memory controller of the processing engine executing the instruction generates packets according to the memory address being accessed.

The engine memory 124 includes a program memory, a register file including one or more general purpose registers, one or more special registers and one or more events registers. In some implementations, the program memory is a physical memory for storing instructions to be executed by the engine core 122 and data to be operated upon by the instructions. In some cases, portions of the program memory are disabled and powered down for energy savings. For example, a top half or a bottom half of the program memory is disabled to save energy when executing a program small enough that half or less of the storage may be needed. The size of the program memory may be 1, 2, 3, or 4 thousand bytes, or any other number of storage units. The register file may include 128, 256, 512, 1024, or any other number of storage units. In some implementations, the storage unit is 32-bit wide, which may be referred to as a longword, and the program memory includes 2K 32-bit longwords and the register file includes 256 32-bit registers.

In some implementations, the register file includes one or more general purpose registers and special registers for the engine core 122. The general purpose registers serve functions that are similar or identical to the general purpose registers of an x86 architecture CPU. The special registers are used for configuration, control and/or status, for instance. Examples of special registers include one or more of the following registers: a next program counter, which may be used to point to the program memory address where the next instruction to be executed by the engine core 122 is stored; and a device identifier (DEVID) register storing the DEVID of the processing device 102.

In some implementations, the register file is implemented in two banks—one bank for odd addresses and one bank for even addresses—to permit multiple fast accesses during operand fetching and storing. The even and odd banks are selected based on the least-significant bit of the register address if the computing system 200 is implemented in little endian or on the most-significant bit of the register address if the computing system 200 is implemented in big-endian.

In some implementations, the engine memory 124 is part of the addressable memory space of the computing system 200. That is, any storage location of the program memory, any general purpose register of the register file, any special register of the plurality of special registers and any event register of the plurality of events registers is assigned a memory address PADDR. Each processing engine 120 on a processing device 102 is assigned an engine identifier (ENGINE ID), therefore, to access the engine memory 124, any addressable location of the engine memory 124 may be addressed by DEVID:CLSID:ENGINE ID: PADDR. In some cases, a packet addressed to an engine level memory location includes an address formed as DEVID:CLSID: ENGINE ID: EVENTS:PADDR, in which EVENTS is one or more bits to set event flags in the destination processing engine 120. It should be noted that when the address is formed as such, the events need not form part of the physical address, which is still DEVID:CLSID:ENGINE ID:PADDR. In this form, the events bits may identify one or more event registers to be set but these events bits are separate from the physical address being accessed.

In accordance with network on a chip architecture, the packet interface 126 includes a communication port for communicating packets of data. The communication port is coupled to the router 112 and the cluster memory 118 of the local cluster. For any received packets, the packet interface 126 directly passes them through to the engine memory 124. In some cases, a processing device 102 implements two mechanisms to send a data packet to a processing engine 120. A first mechanism uses a data packet with a read or write packet opcode. This data packet is delivered to the packet interface 126 and handled by the packet interface 126 according to the packet opcode. Here, the packet interface 126 includes a buffer to hold a plurality of storage units, for example, 1K, 2K, 4K, or 8K or any other number. In a second mechanism, the engine memory 124 further includes a register region to provide a write-only, inbound data interface, which may be referred to a mailbox. In some implementations, the mailbox includes two storage units that each can hold one packet at a time. Here, the processing engine 120 has an event flag, which is set when a packet has arrived at the mailbox to alert the processing engine 120 to retrieve and process the arrived packet. While this packet is being processed, another packet may be received in the other storage unit, but any subsequent packets are buffered at the sender, for example, the router 112 or the cluster memory 118, or any intermediate buffers.

Figure 7A:
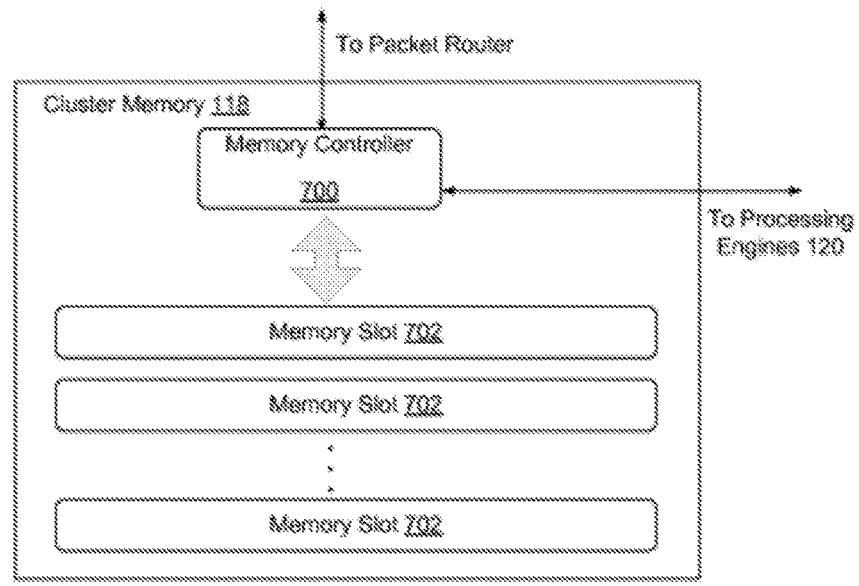
FIG. 7A shows a block diagram of an example of a cluster memory.

FIG. 7A shows a block diagram of an example of a cluster memory 118 of a cluster. The cluster memory 118 includes a memory controller 700 and a plurality of memory slots 702. The memory controller 700 may also be referred to as a cluster memory controller to distinguish it from other memory controllers in a processing device 102; for example, a memory controller for a processing engine 120, or a memory controller for a device controller 106. In some implementations, the memory slots 702 are slots configured to receive memory banks and are configured for memories such as synchronous dynamic random-access memory (SDRAM), double data rate (DDR) SDRAM, DDR2 SDRAM, DDR3 SDRAM, or 3D RAM.

In the example shown in FIG. 7A, the memory controller 700 is coupled to a packet router and to processing engines 120 via different data links. In implementations which have one cluster memory 118 within a cluster 110, the memory controller 700 is coupled to the router 112 of the cluster 110. The memory controller 700 may also be referred to as a smart memory controller because it implements two different access protocols: by packet access and direct memory access.

In some implementations, the data link between the memory controller 700 and a router is a packet-based data communication. In some implementations, the data link between the memory controller 700 and processing engines 120 is a direct data communication. Here, the processing engines 120 coupled to the memory controller 700 are the plurality of processing engines 120 within the same cluster 110 and the direct data communication includes memory access techniques. Examples of existing memory access technologies that may be used for the direct data communication between the memory controller 700 and the plurality of processing engines 120 within the cluster 110 include bus, crossbar, or any other existing memory access techniques for a network on a chip architecture.

Figure 7B:
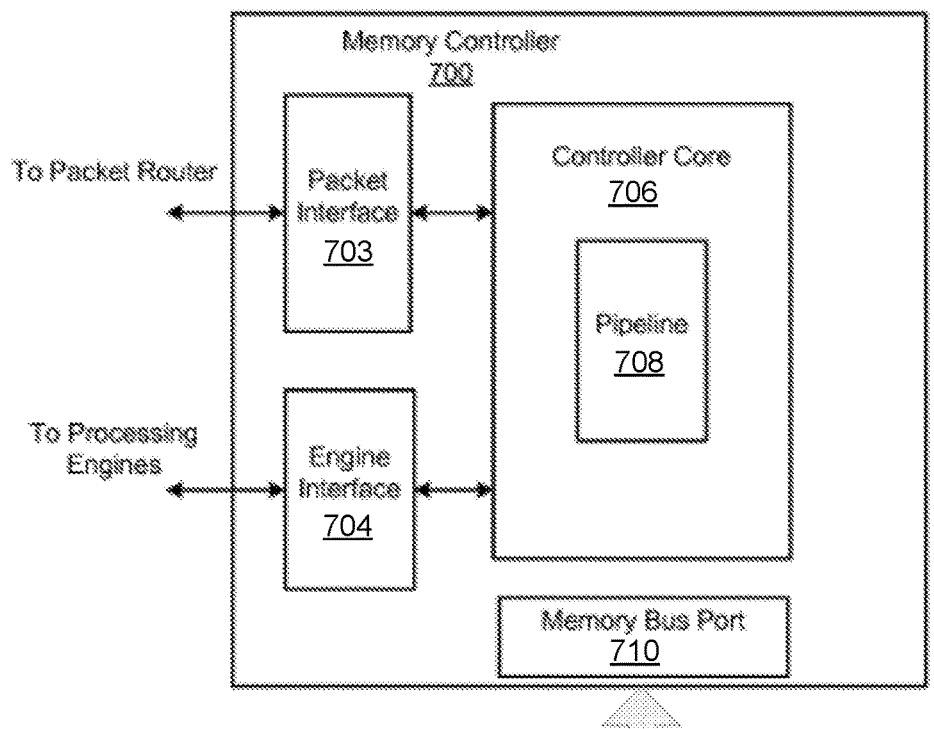
FIG. 7B shows a block diagram of an example memory controller for the cluster memory of FIG. 7A.

FIG. 7B shows a block diagram of an example memory controller 700 for the cluster memory 118 of FIG. 7A. Here, the memory controller 700 includes a packet interface 703, an engine interface 704, a controller core 706 and a memory bus port 710. The engine interface 704 is configured to support direct memory access by the processing engines 120 within the cluster 110. As such, the engine interface 704 implement part or all features of access technologies, such as but not limited to include bus, crossbar, or any other memory access techniques for a network on a chip architecture. The packet interface 703 includes hardware components configured to receive and transmit packets to a router. In some implementations, the packet interface 703 include a queue to buffer received packets and another queue to buffer packets to be sent. Once a packet is received at the packet interface 703, it is forwarded to the controller core 706 for processing. The memory bus port 710 is a data connection port configured to couple the memory controller 700 to the memory slots 702.

The controller core 706 is configured to decode a received packet, perform a memory operation (if required by the packet opcode), and generate a result packet (if necessary). For example, if a received packet has a packet opcode for a memory write, the controller core 706 extracts data from the received packet and writes the data to the memory bank at an address specified in the packet. Likewise, if a received packet has a packet opcode for a memory read, the controller core 706 reads data from the memory address specified in the packet, places the data in a new packet with a destination address specified in the read packet, and sends the new packet to the packet interface 703 to be queued for transmission. In some implementations, the controller core 706 has a structure similar to a typical CPU. For example, the controller core 706 includes an optional pipeline 708 to perform the steps of decoding the packet, performing the memory operation, and generating a result packet.

A computing system can use packets for data requests and delivery among different computing resources of the system. A packet can include a header and an optional payload. The header can include a destination address field, a packet opcode (POP) field, and a size field. In some implementations, a source address field is not required to be included within a packet. A destination address field can indicate the address of the destination computing resource of the packet. In some implementations, the destination address can be an address at a device controller level such as DEVID:PADDR, an address at a cluster level such as a physical address DEVID:CLSID:PADDR or a virtual address DEVID:CLSI-D:ADDR, or an address at a processing engine level such as DEVID:CLSID:ENGINE ID:PADDR or DEVID:CLSID:ENGINE ID:EVENTS:PADDR. In some implementations, a packet header can include an addressing mode field and an addressing level field. The addressing mode field can include a value to indicate whether the packet's destination address field contains a physical address or a virtual address that may need to be converted to a physical address at a destination. The addressing level field can include a value to indicate whether the destination is at a device, cluster memory, or processing engine level.

The POP field may include a code to indicate an operation to be performed by the destination computing resource. Exemplary operations in the POP field may include read (to read data from the destination) and write (to write data, e.g., in a packet payload to the destination). In some implementations, examples of operations in the POP field further include bulk data transfer. For example, certain computing resources implement a direct memory access (DMA) feature. Examples of computing resources that implement DMA may include a cluster memory controller of each cluster memory 118, a memory controller of each engine memory 124, and a memory controller of each device controller 106. A computing resource that implements the DMA may perform bulk data transfer to another computing resource using packets with a packet opcode for bulk data transfer. In addition to bulk data transfer, the examples of operations in the POP field further include transmission of unsolicited data. For example, any computing resource may generate a status report or incur an error during operation, the status or error is reported to a destination using a packet with a packet opcode indicating that the payload contains the source computing resource and the status or error data. The POP field may be 2, 3, 4, 5 or any other number of bits wide. In some implementations, the width of the POP field is selected depending on the number of operations defined for packets in a computing system. In some implementations, a packet opcode value can have different meaning based on the type of the destination computing resource that receives it. For example, for a three-bit POP field, a value 001 may be defined as a read operation for a processing engine 120 but a write operation for a cluster memory 118.

A packet can include a payload. In some implementations, if a particular packet does not include a payload, the packet length field of the header has a value of zero. In some implementations, the payload of the packet includes a return address. For example, if a packet is a read request, the return address for any data to be read can be contained in the payload.

Figure 8A:
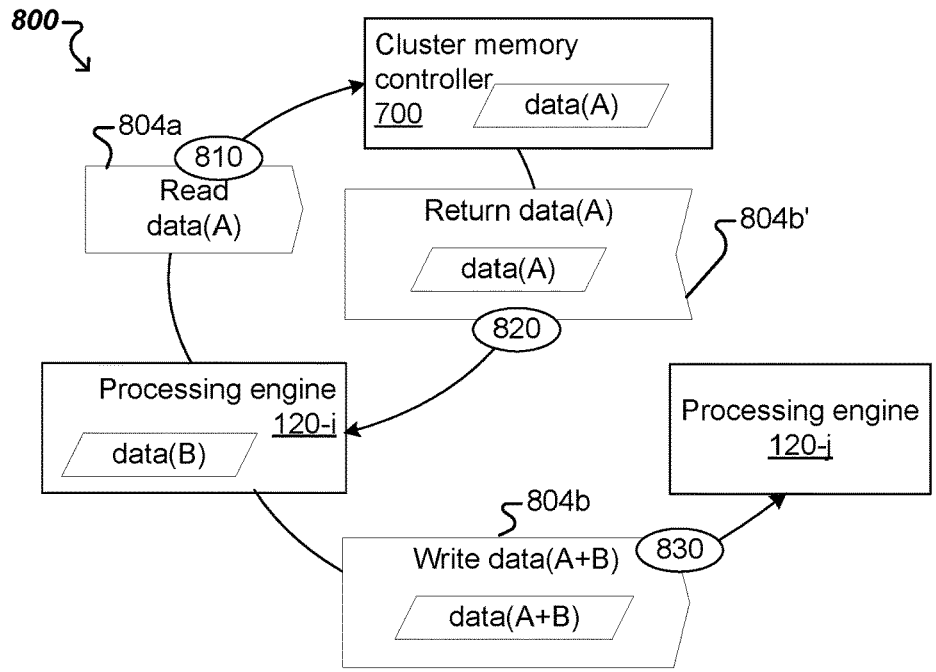
FIGS. 8A and 8B show different examples of processes for reading and writing data within a network on a chip based computing system using packet based communications.
Figure 8B:
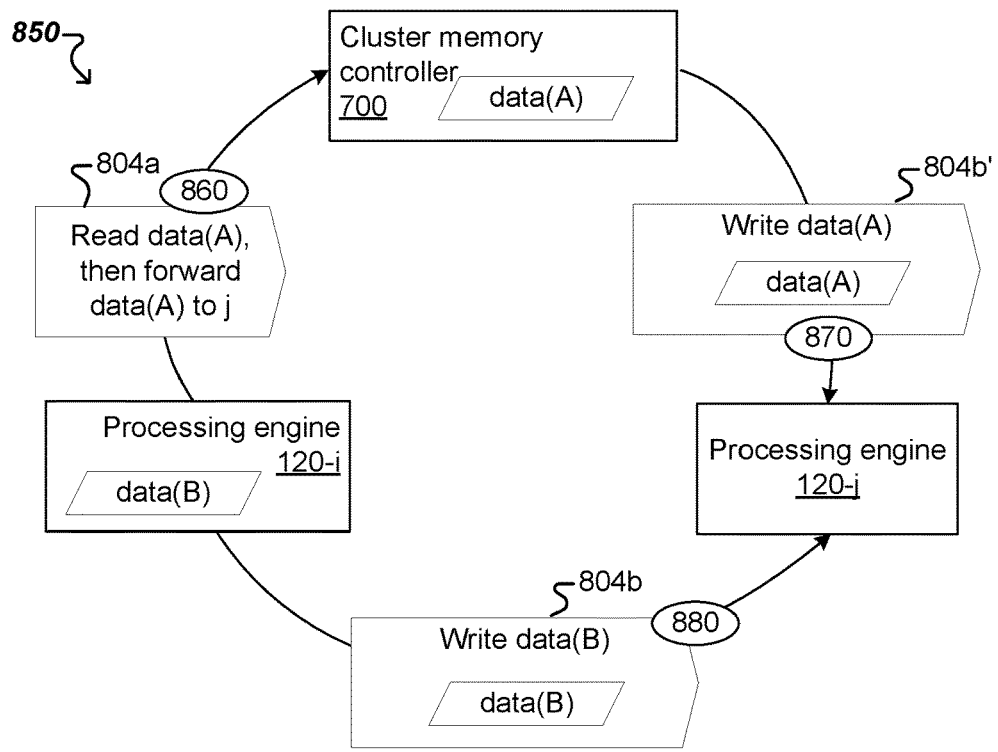
Figure 8C:
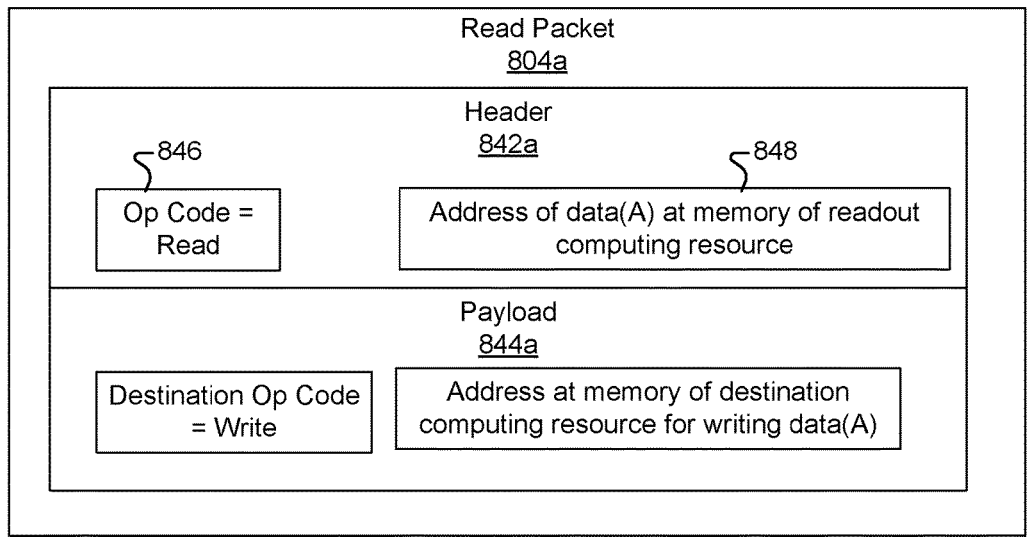
FIGS. 8C and 8D show different examples of packet formats associated with the processes of FIGS. 8A and 8B.
Figure 8D:
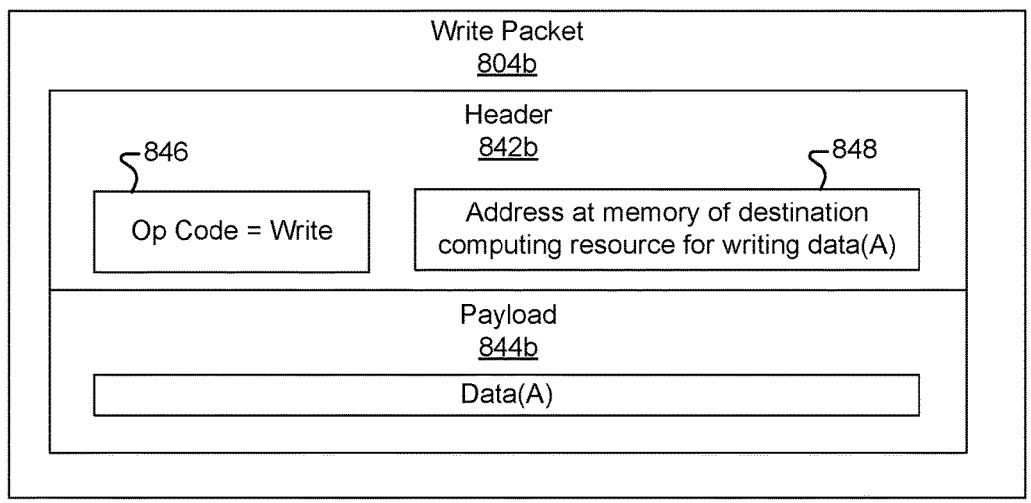

FIGS. 8A and 8B show different examples of processes 800 and 850 for reading and writing data within a network on a chip based computing system using packet based communications. FIGS. 8C and 8D show different examples of packet formats associated with the processes of FIGS. 8A and 8B. In more detail, FIGS. 8A and 8B show aspects of respective examples of processes 800 and 850 of writing first data, stored in a memory associated with an originator computing resource, and second data, stored in a memory associated with an intermediary computing resource, to a memory associated with a destination computing resource, where read packets 804a and write packets 804b are used to perform the processes 800 and 850. The originator computing resource, the intermediary computing resource and the destination computing resource are part of a network on a chip based computing system. The computing resources that can implement processes 800 and 850 can include device controller 106, cluster controller 116, AIP 114, super cluster controller 132, processing engine 120, memory controller 700 of cluster memory 118. Other resources are possible.

In the examples illustrated in FIGS. 8A and 8B, the originator computing resource includes a processing engine 120-$i$, the intermediary computing resource includes a cluster memory controller 700 and the destination computing resource includes another processing engine 120-$j$. Here, a cluster memory (e.g., 118) controlled by the cluster memory controller 700 may be part of the same cluster (e.g., 110) to which one or both of the processing engines 120-$i$ and 120-$j$ belong, or may be part of a different cluster of the same processing device (e.g., 102) or of a different processing device. Moreover, the processing engines 120-$i$ and 120-$j$ may be part of the same cluster, or may be part of different clusters of the same processing device or of a different processing device.

Referring now to FIG. 8A, the process 800 of writing data B (denoted data(B)), stored in a memory associated with the processing engine 120-$i$, and data A (denoted data(A)), stored in cluster memory (e.g., 118) controlled by the cluster memory controller 700, to a memory associated with the other processing engine 120-$j$ is described first. The processing engine 120-$i$ accesses data(B) in the memory associated with the processing engine 120-$i$. Additionally, at 810, the processing engine 120-$i$ transmits a read packet 804$a$ to instruct the cluster memory controller 700 to read data(A) from the cluster memory. In response to receiving this instruction, the cluster memory controller 700 accesses data(A) in the cluster memory and, at 820, transmits data(A) in a response packet 804$b'$ to the processing engine 120-$i$. At 830, the processing engine 120-$i$ transmits a write packet 804$b$, that includes data(A) and data(B) (denoted as appended data(A+B)), to the other processing engine 120-$j$. The write packet 804$b$ also includes data specifying an instruction for the other processing engine 120-$j$ to write appended data(A+B) to the memory associated with the other processing engine 120-$j$. Upon receipt of the write packet 804$b$, the other processing engine 120-$j$ writes appended data(A+B) to the memory associated with the other processing engine 120-$j$, as instructed.

Referring now to FIG. 8B, the process 850 of writing data(B), stored in a memory associated with the processing engine 120-$i$, and data(A), stored in cluster memory (e.g., 118) controlled by the cluster memory controller 700, to a memory associated with the other processing engine 120-$j$ is described next. The processing engine 120-$i$ accesses data (B) in the memory associated with the processing engine 120-$i$. Additionally, at 860, the processing engine 120-$i$ transmits a read packet 804$a$ to instruct the cluster memory controller 700 to read data(A) from the cluster memory and to forward data(A) to the other processing engine 120-$j$ for writing to the memory associated with the other processing engine 120-$j$. In response to receiving this instruction, the cluster memory controller 700 accesses data(A) in the cluster memory and, at 870, transmits data(A) in a write packet 804$b'$ to the other processing engine 120-$j$. The write packet 804$b$ also includes data specifying an instruction for the other processing engine 120-$j$ to write data(A) to the memory associated with the other processing engine 120-$j$. Upon receipt of the write packet 804$b$, the other processing engine 120-$j$ writes the data(A) to the memory associated with the other processing engine 120-$j$, as instructed. In the meantime, at 880, the processing engine 120-$i$ (asynchronously) transmits another write packet 804$b$ that includes data(B) to the other processing engine 120-$j$. The other write packet 804$b$ also includes data specifying an instruction for the other processing engine 120-$j$ to write data(B) to the memory associated with the other processing engine 120-$j$. Upon receipt of the other write packet 804$b$, the other processing engine 120-$j$ writes the data(B) to the memory associated with the other processing engine 120-$j$, as instructed.

FIG. 8C shows an example of a read packet 804$a$ that can be used in either of the processes 800 or 850 to instruct a readout computing resource (e.g., cluster memory controller 700) of a computing system to read data(A). In this example, the read packet 804$a$ has a header 842$a$ and a payload 844$a$. The header 842$a$ can include an opcode 846 and a destination address. In this example, the destination address includes address 848 of data(A) at memory associated with the readout computing resource to which the read packet 804$a$ is addressed. Here, the opcode 846 has a value corresponding to a "read" operation and specifies an instruction for the readout computing resource to read data(A) from the memory address 848. The payload 844$a$ can include information relating to a destination computing device where data(A) is to be forwarded to after it has been read by the readout computing device from the memory address 848. Here, the payload 844$a$ includes at least an opcode that specifies an instruction for the destination computing resource to write data(A), and a memory address at which the destination computing resources should write data(A).

FIG. 8D shows an example of a write packet 804$b$ that can be used in either of the processes 800 or 850 to instruct a destination computing resource (e.g., a processing engine 120-$j$) of a computing system to write data(A) provided in the write packet. In this example, the write packet 804$b$ includes a header 842$b$ and a payload 844$b$. The payload 844$b$ includes data(A). The header 842$b$ includes at least an opcode 846 and an address 848 at memory associated with the destination computing resource. Here, the opcode 846 has a value corresponding to a "write" operation and specifies an instruction for the destination computing resource to write data(A) at the address 848.

Referring again to FIG. 8A, note that, by performing the process 800, it is insured that data(A), initially stored at an intermediary computing resource, in this case at the cluster memory, reaches a destination computing resource, in this case the other processing engine 120-$j$, no later than data(B), initially stored at an originator computing resource, in this case the processing engine 120-$i$, so that, e.g., the destination computing resource can process data(A) before processing data(B). Moreover, by performing the process 850 described in connection with FIG. 8B, it is not guaranteed that data(A), initially stored at the intermediary computing resource, in this case at the cluster memory, reaches the destination computing resource, in this case the other processing engine 120-$j$, no later than data(B), initially stored at the originator computing resource, in this case the processing device 120-$i$, so that, e.g., the destination computing resource can process data(A) before processing data(B).

FIG. 9A shows a format of an example of a distributed contiguous read packet 901. The packet 901 can include a header 912 and a payload 914. The header 912 can include a packet length field, an opcode field, and a destination address field. The destination address of the header 912 can include a device identifier component and a memory address component. In this example, the opcode is set to a value corresponding to a DCR operation, and the memory address component is unused and can be set to zero or any other value. Further, since the destination device corresponding to the device identifier includes a unique memory region for DCR operations, and since the opcode specifies that the packet 901 is a DCR packet, the destination device can ignore the memory address component and forward the packet 901 to the DCR handler. In some implementations, based on the destination device having multiple DCR memory regions, the memory address component can be used to specify a particular DCR memory region.

A read size for the DCR operation can be included in the payload 914. In some implementations, the read size specifies the number of data elements to read from the destination device's DCR memory region. In some implementations, the read size specifies the number of bytes, or other units such as words or bits, to read from the destination device's DCR memory region. The destination device can prepare a response packet that includes one or more data elements fetched by the DCR operation. The response packet can include the response opcode, e.g., a write, specified in the payload 914 and can be addressed to the destination address specified in the payload 914.

FIG. 9B shows a format of another example of a distributed contiguous read packet 951. The packet 951 can include a header 962 and a payload 964. The header 962 can include a packet length field, an opcode field, and a destination address field. The destination address in the header 962 can include a device identifier component and a memory address component. In this example, the opcode is set to a value corresponding to a nominal read operation, and the memory address component includes a DCR memory region identifier. The destination device corresponding to the device identifier can examine the memory address component to determine to treat the packet 951 as a nominal read packet or a DCR packet. A read size for the DCR operation can be included in the payload 964. In some implementations, the read size specifies the number of data elements, the number of bytes, the number of words, or the number of other units to read from the destination device's DCR memory region. The destination device can prepare a response packet that includes data fetched by the DCR operation. The response packet can include the response opcode, e.g., a write, specified in the payload 964 and can be addressed to a response destination address specified in the payload 964.

Figure 10:
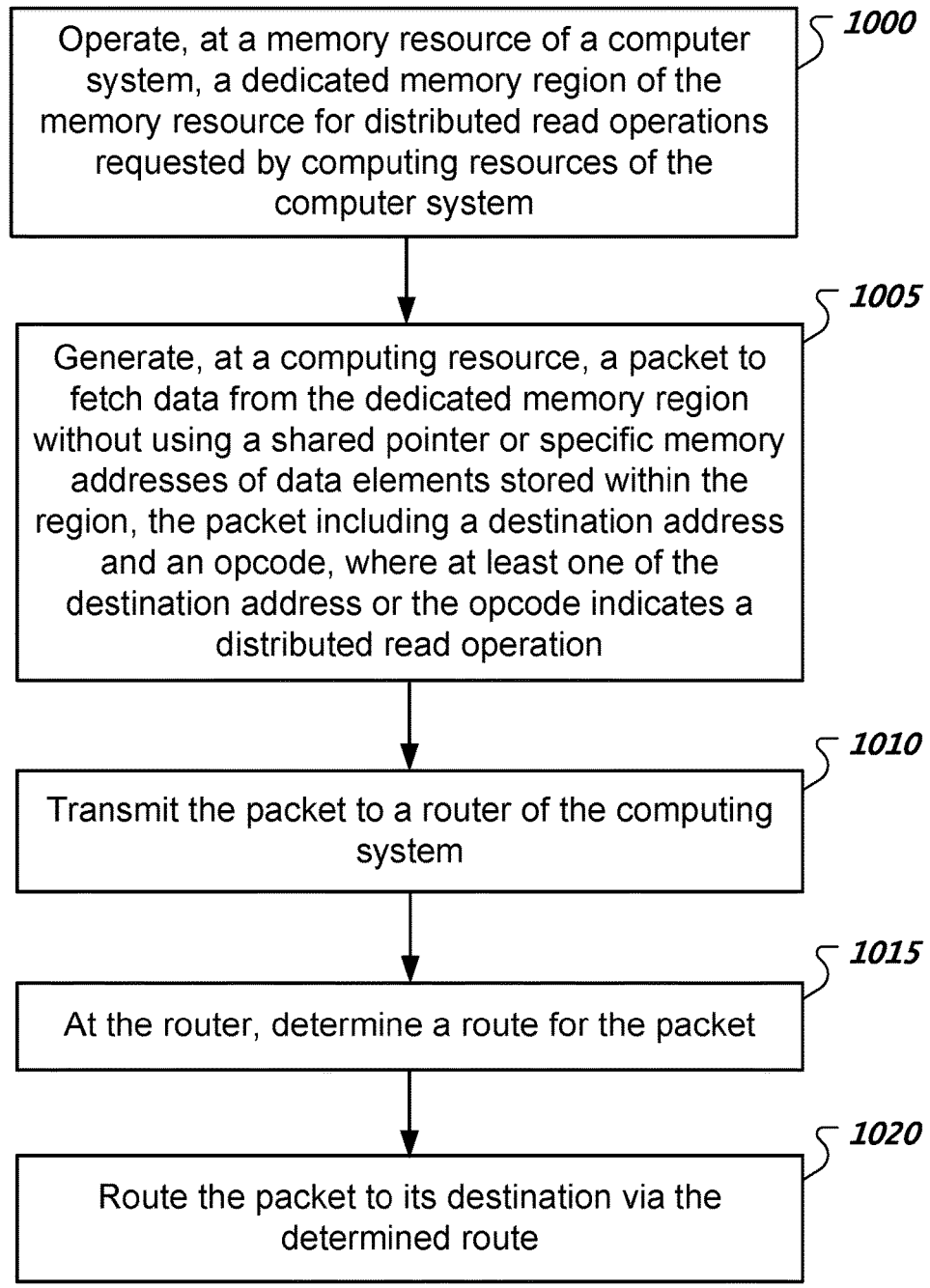
FIG. 10 shows a flow diagram of an example of a distributed contiguous read process of a computing system.

FIG. 10 shows a flow diagram of an example of a DCR process of a computing system. A computing system can include processing devices, such as computing resources and memory resources, configured to execute some or all of the operations of the DCR process in response to instructions stored electronically on an electronic storage medium. The one or more processing devices can be configured through hardware, firmware, and/or software to execute one or more of the operations of the DCR process. At 1000, the DCR process can operate, at a memory resource of the computer system, a dedicated memory region of the memory resource for distributed read operations requested by computing resources of the computer system. The dedicated memory region for distributed read operations can be referred to as a DCR memory region. Operating the dedicated memory region can include maintaining data structures such as pointers, counters, or both that define the DCR memory region, and track a current read location. Operating the dedicated memory region can include maintaining a read queue to order incoming DCR packets and to hold DCR packets should the DCR memory region be empty. An empty DCR memory region indicates that there are no valid data elements currently stored in the region.

At 1005, the process can generate, at a computing resource of the computing system, a packet to fetch data from the dedicated memory region without using a shared pointer or specific memory addresses of respective data elements stored within the dedicated memory region. The packet includes a destination address and an opcode, where at least one of the destination address or the opcode indicates a distributed read operation. The computing resource can include one or more processors, specialized logic, or a combination thereof. The computing resource can include circuitry to generate packets. The computing resource can be, for example, a device controller, a cluster controller, a super cluster controller if a super cluster is implemented, an AIP, a memory controller for a cluster memory, CPU, FPGA, or a processing engine.

At 1010, the process can transmit the packet from the computing resource to a router of the computing system. In some implementations, if the computing resource is a device controller, the generated packet can be transmitted to a top level router of the local processing device; if the source computing resource is a cluster controller, the generated packet can be transmitted to a router of the local cluster; if the source computing resource is a memory controller of the cluster memory, the generated packet can be transmitted to a router of the local cluster, or a router downstream of the router if there are multiple cluster memories coupled together by the router downstream of the router; and if the source computing resource is a processing engine, the generated packet can be transmitted to a router of the local cluster if the destination is outside the local cluster and to a memory controller of the cluster memory of the local cluster if the destination is within the local cluster.

At 1015, the process can determine a route for the packet at the router. In some implementations, determining a route can include performing a route lookup based on a device identifier included in a destination address of the packet. In this example, the device identifier corresponds to a memory resource. In some implementations, the determined route can include an identifier of an output packet interface of the router. At 1020, the process routes the generated packet to its destination via the determined route.

Figure 11:
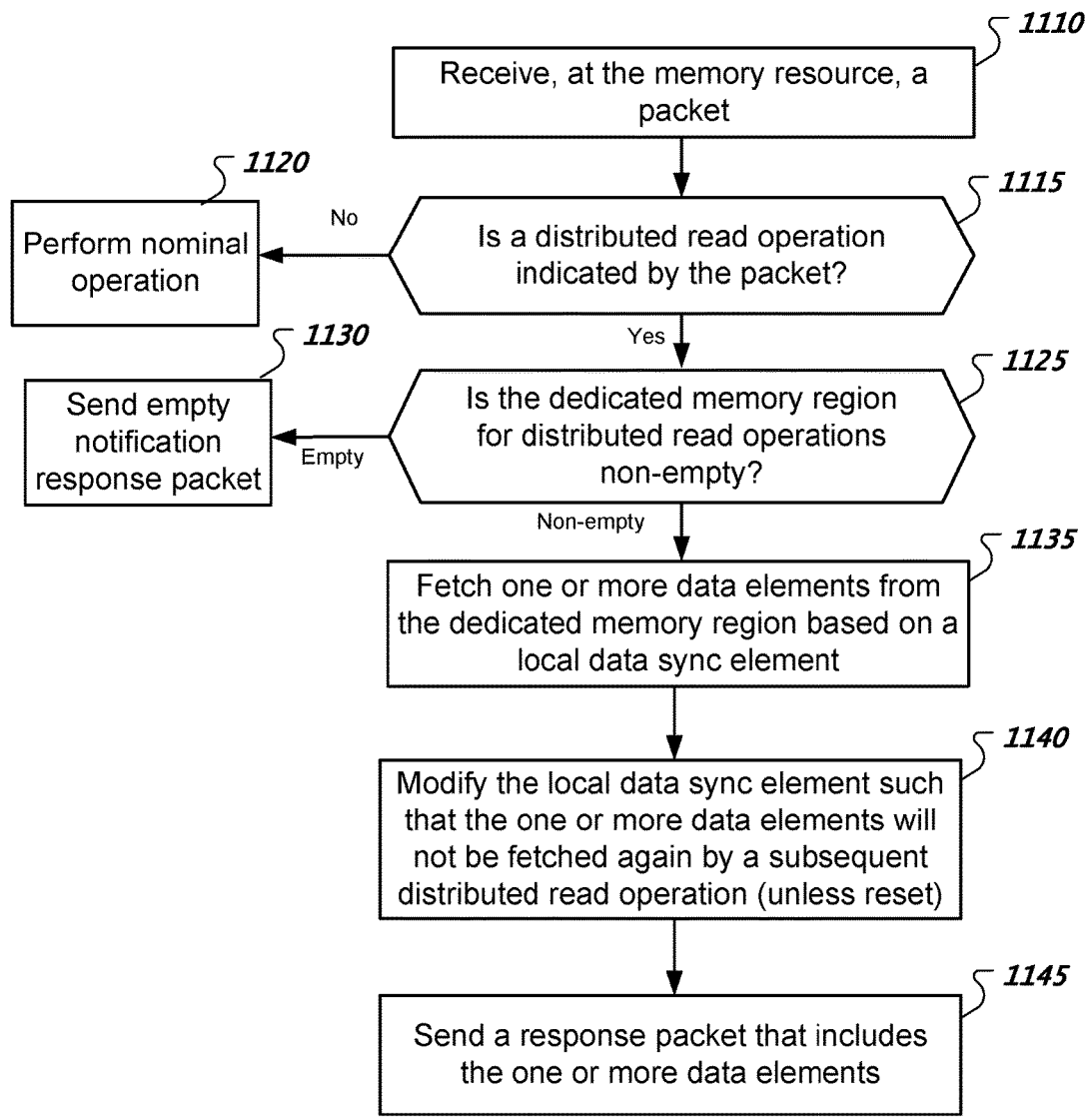
FIG. 11 shows a flow diagram of an example of a process to handle a distributed contiguous read packet at a memory resource.

FIG. 11 shows a flow diagram of an example of a process to handle a distributed contiguous read packet at a memory resource. At 1110, the process receives, at the memory resource, a packet such as a packet generated by the process of FIG. 10. At 1115, the process determines whether the packet indicates a distributed read operation. In some implementations, determining whether the packet indicates a distributed read operation can include extracting an opcode value from the packet and determining if the opcode value specifies a distributed read operation. In some implementations, determining whether the packet indicates a distributed read operation can include extracting an opcode value from the packet, determining if the opcode value specifies a nominal read operation, and determining whether a memory address portion of the destination address is associated with distributed read operations. For example, a memory address associated with distributed read operations can be a predetermined value (e.g., all zeros 0x00000000).

If a packet does not indicate a distributed read operation, then the process performs a nominal operation, such as a write or read operation, based on the packet at 1120. If a packet does indicate a distributed read operation, then the process determines whether the dedicated memory region for distributed read operations is non-empty at 1125. In some implementations, determining whether the dedicated memory region is non-empty can include determining whether there are elements that are available for fetching. If the region is empty, then the process can send an empty notification response packet at 1130. The empty notification response packet can indicate that there are no data elements available for fetching. In some implementations, the empty notification response packet is sent to all computing resources, e.g., by using a broadcast or multicast mechanism. In some implementations, the process sends a unicast empty notification response for each received distributed read packet while the empty condition exists.

Based on the dedicated memory region being non-empty, the process at 1135 fetches one or more data elements from the dedicated memory region based on a local data synchronization element. A local data synchronization element can include information such as a location of the next data element to distribute, the number of valid data elements stored in the dedicated memory region, local memory addresses that defined the top and bottom of the dedicated memory region, or a combination thereof. In some implementations, a local data synchronization element can include one or more counters, pointers, or both to perform synchronization such that after a data element is distributed, the data element will not be distributed again by a subsequent distributed read operation on the dedicated memory region.

At 1140, the process modifies the local data synchronization element such that the one or more data elements will not be fetched again by a subsequent distributed read operation. In some implementations, modifying the local data synchronization element can include advancing a current read pointer such that the one or more data elements will not be fetched again by a subsequent distributed read operation on the dedicated memory region. In some implementations, modifying the local data synchronization element can include modifying a counter, e.g., incrementing or decrementing, such that the one or more data elements will not be fetched again by a subsequent distributed read operation on the dedicated memory region. In some implementations, the process can include determining whether to allow data elements in a DCR memory region to be read again and resetting a pointer such that the data elements will be read again. A distributed task, for example, can include iterating through a data set multiple times. A DCR memory region can be loaded with such a data set, and after all the data elements from the data set are read during a first pass, the process can reset a pointer such the data elements will be read again during a second pass through the data set.

At 1145, the process sends a response packet that includes the one or more data elements. The process can generate the response packet based on a response opcode and a response destination address stored in a payload of the received distributed contiguous read packet. In some implementations, if the one or more data elements and packet overhead collectively exceed a maximum packet size, the process can send two or more response packets that include the one or more data elements. The final packet of the two or more response packets can include an indicator to indicate that it's the end of the data. In some implementations, a memory controller logic can generate an event within the system which the system's devices can use as an indicator that the data from a particular DCR memory region have been exhausted.

In some implementations, after fetching one or more data elements, the process can modify the local data synchronization element such that the one or more data elements are marked as read. In some implementations, after fetching one or more data elements, the process can modify the local data synchronization element such that the one or more data elements are deemed removed. Modifying the local data synchronization element can include advancing a current read pointer such that the one or more data elements will not be fetched again by a subsequent distributed read operation on the dedicated memory region, and once advanced, the fetched data elements are effectively removed and can be overwritten by new data elements. Modifying the local data synchronization element can include modifying a counter, e.g., incrementing or decrementing, to effect removal of the fetched data elements from the dedicated memory region.

Figure 12:
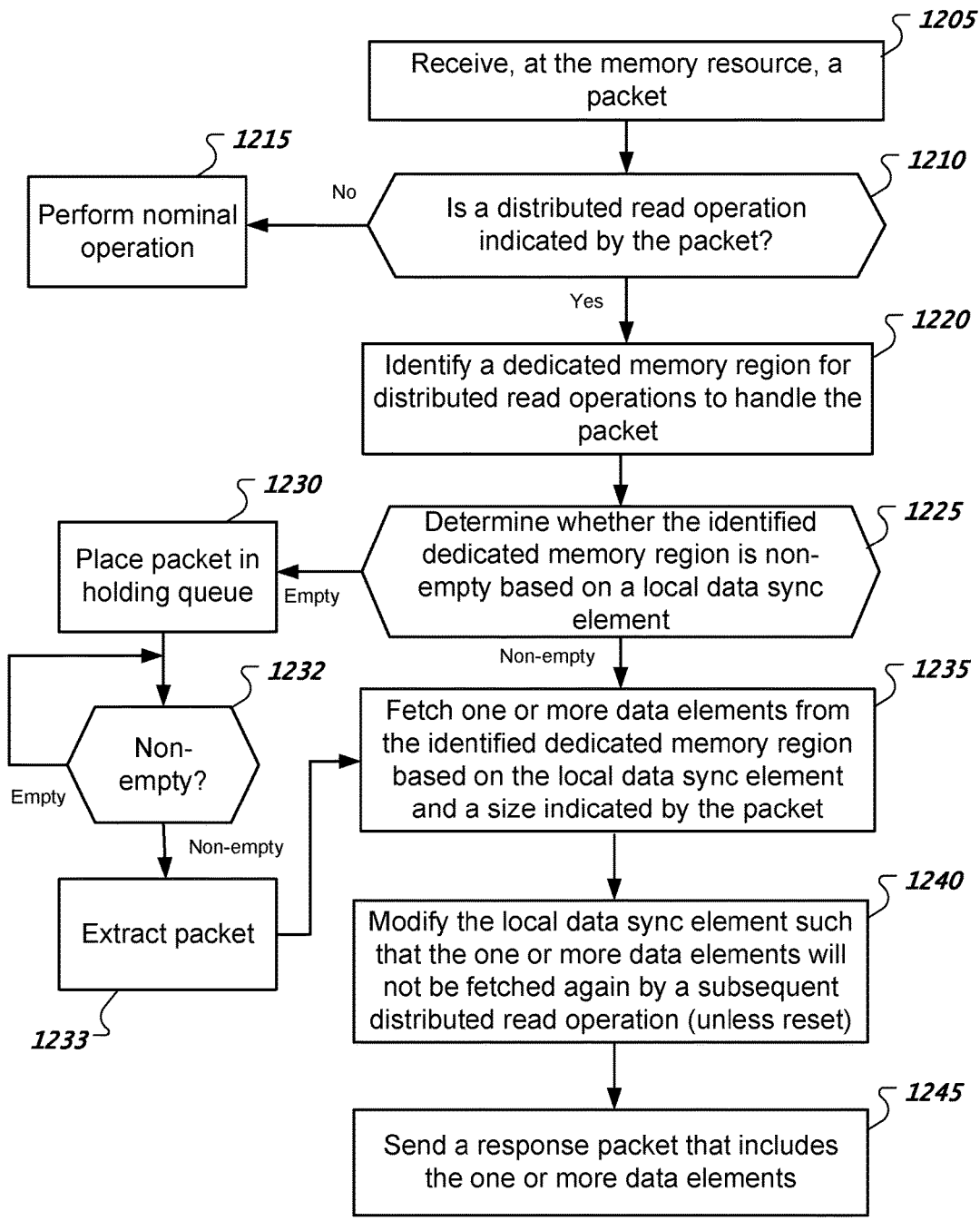
FIG. 12 shows a flow diagram of another example of a process to handle a distributed contiguous read packet at a memory resource.

FIG. 12 shows a flow diagram of another example of a process to handle a distributed contiguous read packet at a memory resource. At 1205, the process receives, at the memory resource, a packet such as a packet generated by the process of FIG. 10. At 1210, the process determines whether the packet indicates a distributed read operation. If a packet does not indicate a distributed read operation, then the process performs a nominal operation based on the packet at 1215. If a packet does indicate a distributed read operation, then the process identifies a dedicated memory region for distributed read operations to handle the packet at 1220. In some implementations, the destination address of the packet can include a DCR memory region indicator. In some implementations, the DCR memory region indicator is a memory address having a predetermined value within a reserved and/or non-usable memory address range. In some implementations, a non-usable memory address or range refers to a memory address or range that is not usable for nominal memory accesses, specifically, that there is no physical memory corresponding to the address or range. In some implementations, there are multiple DCR memory regions that are accessed via a set of predetermined addresses, e.g., 0xA0000000, 0xA0000001, and 0xA0000002. In some implementations, a DCR memory region is accessed by a memory resource using control registers located at static addresses or static register locations, where the registers specify the addresses for respective DCR memory regions. The value loaded into each register can be configurable and can vary on each initialization of a DCR memory region.

At 1225, the process determines whether the identified dedicated memory region for distributed read operations is non-empty based on a local data synchronization element. A non-empty determination can include determining whether a pointer and/or a counter within the local data synchronization element indicates that there are one or more data elements available for distribution within the region. A memory resource can operate one or more local data synchronization elements for one or more DCR dedicated memory regions. The process can include selecting the appropriate local data synchronization element for making the non-empty determination.

If the identified region is empty, then the process places the packet into a holding queue at 1230. The process, at 1232, monitors for when the identified dedicated memory region becomes non-empty. When the identified dedicated memory region becomes non-empty, the process can extract the packet from the queue at 1233 and continue to 1235.

Based on the dedicated memory region being non-empty, the process at 1235 fetches one or more data elements from the dedicated memory region based on the local data synchronization element and a size indicated by the packet. Fetching one or more data elements can include accessing a data element based on a current read pointer or a current read counter. Fetching one or more data elements can include accessing one or more additional data elements based on a value of DCR size field in the packet.

At 1240, the process modifies the local data synchronization element such that the one or more data elements will not be fetched again by a subsequent distributed read operation. In some implementations, the process can determine to reset the local data synchronization element to allow data elements to be fetched again. In some implementations, the process modifies the local data synchronization element such that the one or more data elements are deemed removed. In some implementations, while the value for a removed data element may still exist in the dedicated memory region, it is no longer accessible by a subsequent DCR packet, and can be overwritten by a write operation. In some implementations, removing a data element can include advancing a pointer. In some implementations, removing a data element can include incrementing a counter. At 1245, the process sends a response packet that includes the one or more data elements.

Figure 13:
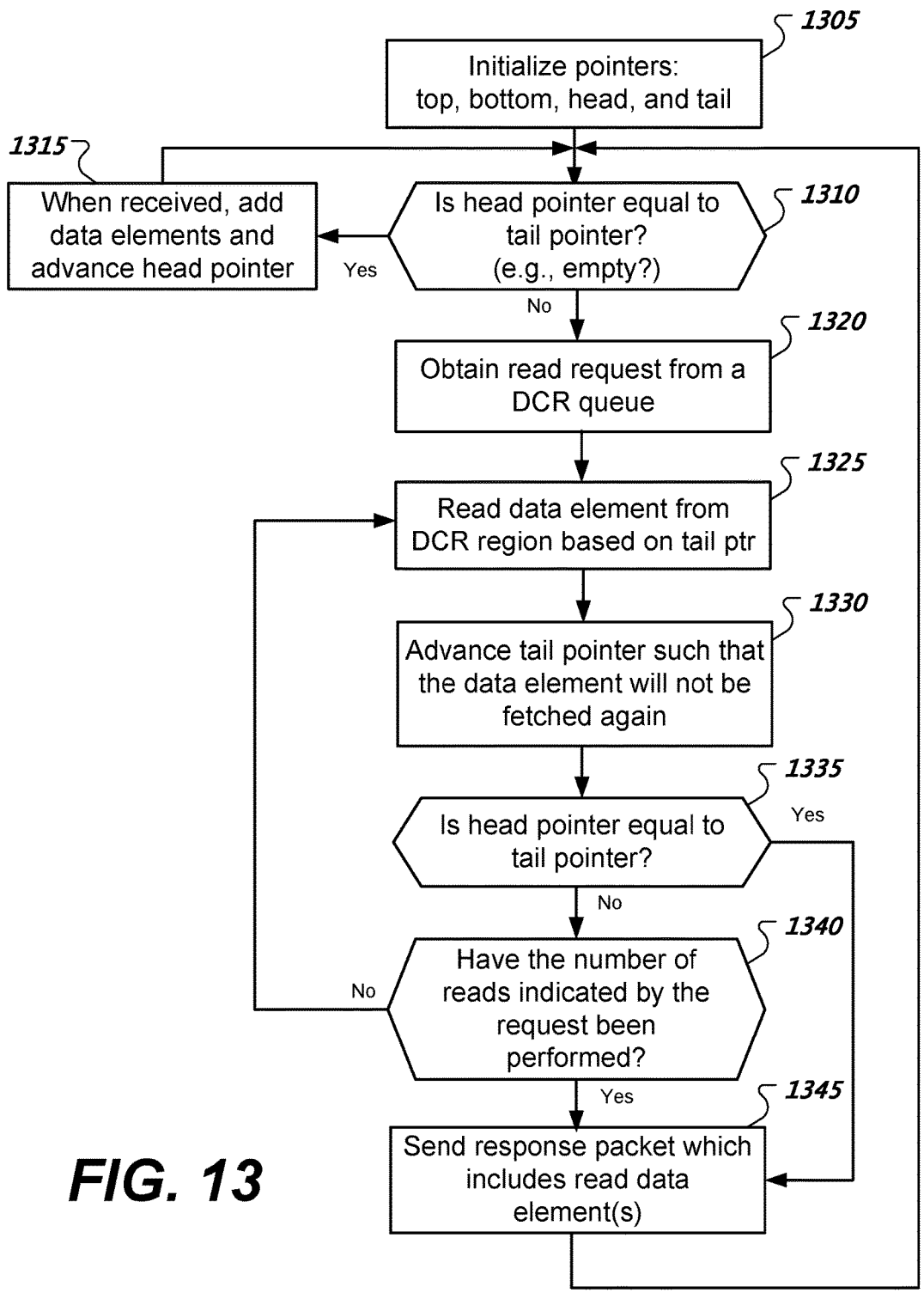
FIG. 13 shows a flowchart of a process for handling pointers associated with a distributed contiguous read memory region and for handling packets.

FIG. 13 shows a flowchart of a process for handling pointers associated with a distributed contiguous read memory region and for handling packets. A memory controller, in some implementations, can be configured to perform this process. At 1305, the process initializes pointers including top, bottom, head, and tail pointers. In some implementations, the top and bottom pointers can point to memory addresses defining a start and an end of a memory region of a memory. At initialization, the head and tail pointers can be set to equal the top pointer. Other pointer configurations and initializations are possible. In some implementations, the pointers are stored in registers of a memory controller. In some implementations, the pointers are stored in a memory coupled with a memory controller.

At 1310, the process determines whether the head pointer is equal to the tail pointer. If the pointers are equal (e.g., empty), then at 1315, the process adds one or more data elements to the DCR memory region when they are received via a write operation and advances the head pointer. Advancing the head pointer can include incrementing the head pointer by a predetermined amount, which can correspond to a size of one or more added data elements. In some implementations, if the head pointer reaches the bottom pointer, the process can wrap the head pointer around to the top based on the top pointer.

Based on the head pointer being not equal to the tail pointer (implying that the DCR memory region is non-empty), the process at 1320, obtains a read request from a DCR queue 1320. A DCR packet, or relevant portions thereof, can be inserted in the DCR queue after it is received. Obtaining a read request can include extracting a DCR packet, or portion thereof, from the DCR queue.

At 1325, the process reads a data element from the DCR memory region based on the tail pointer. In some implementations, a memory controller can issue a read command to retrieve a data element residing at a location specified by the tail pointer. At 1330, the process advances the tail pointer such that the data element will not be fetched again. Advancing the tail pointer can include incrementing the tail pointer by a predetermined amount, which can correspond to a size of a data element. In some implementations, if the tail pointer reaches the bottom pointer, the process can wrap the tail pointer based on the top pointer.

At 1335, the process determines whether the head pointer is equal to the tail pointer. If the pointers are equal (implying that the DCR memory region is empty), the process sends a response packet that includes one or more read data elements at 1345. If the pointers are not equal (implying that the DCR memory region is non-empty), the process determines whether the number of reads indicated by the request have been performed at 1340. If there are more reads to perform for the same request, then the process continues at 1325 to fetch the next data element for the response packet. If the number of reads indicated by the request have been performed, then the process, at 1345, sends the response packet which includes the one or more read data elements. After sending the response packet, the process continues at 1310 to process the next DCR packet.

Figure 14:
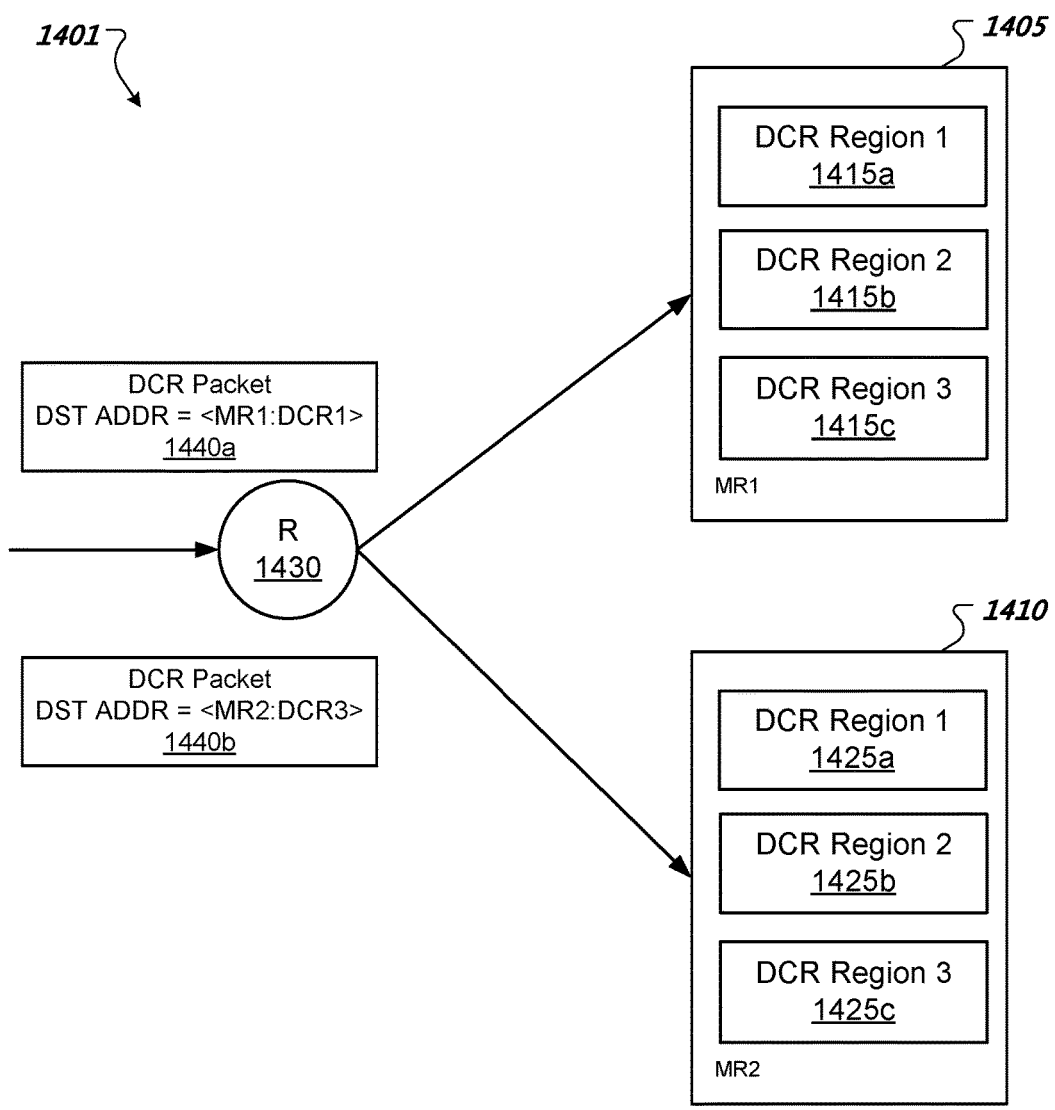
FIG. 14 shows an example of routing distributed contiguous read packets within a computing system.

FIG. 14 shows an example of routing DCR packets 1440*a-b* within a computing system 1401. The computing system 1401 includes a first memory resource (MR1) 1405, a second memory resource (MR2) 1410, a router 1430, and computing resources (not shown). MR1 1405 includes DCR memory regions 1415*a-c*; M2 1410 includes DCR memory regions 1425*a-c*. Computing resources (not shown) within the system 1401 have sent DCR packets 1440*a-b*. The router 1430 is configured to route the packets 1440*a-b* to their respective destination addresses.

The router 1430 routes packet 1440*a* to MR1 1405 since a device identifier for MR1 1405 is included in the destination address of the packet 1440*a*. MR1 1405 forwards the packet 1440*a* to the DCR memory region 1415*a* corresponding to the DCR memory region identifier included in the destination address of the packet 1440*a*. In some implementations, the DCR memory region indicator is a memory address having a predetermined value. Forwarding the packet 1440*a* can include inserting the packet 1440*a* into a read queue associated with the identified DCR memory region 1415*a*. The router 1430 routes the other packet 1440*b* to MR2 1410 since the device identifier for MR2 1410 is included in the destination address of the packet 1440*b*. MR2 1410 forwards the packet 1440*b* to the DCR memory region 1425*c* corresponding to the DCR memory region identifier included in the destination address of the packet 1440*b*.

A system can include computing resources; and a memory resource configured to maintain a dedicated memory region of the memory resource for distributed read operations requested by the computing resources. The computing resources can be configured to generate a first packet to fetch data from the dedicated memory region of the memory resource without using memory addresses of respective data elements stored within the dedicated memory region of the memory resource, and send the first packet to the memory resource. The first packet can include a destination address that can include an identifier to route the first packet to the memory resource. The first packet can include an opcode that specifies an operation to be performed by the memory resource, where at least one of the destination address or the opcode indicates a distributed read operation. The memory resource can be configured to receive the first packet, determine whether the first packet indicates the distributed read operation, determine that the dedicated memory region is non-empty, fetch one or more data elements from the dedicated memory region based on the first packet indicating the distributed read operation and the dedicated memory region being non-empty, and send a second packet that includes the one or more data elements.

In some implementations, the first packet can include a read size field. The memory resource can be configured to fetch the one or more data elements based on a value of the read size field. In some implementations, the memory resource can include a first pointer, a second pointer, and a current read pointer, wherein the first pointer and the second pointer define an area of a memory structure that corresponds to the dedicated memory region. The memory resource can be configured to fetch the one or more data elements based on the first pointer, the second pointer, and the current read pointer, and advance the current read pointer such that the one or more data elements will not be fetched again by a subsequent distributed read operation on the dedicated memory region. In some implementations, the memory resource can include a third pointer. The memory resource can be configured to determine whether the dedicated memory region is non-empty by making a comparison based on the current read pointer and the third pointer. In some implementations, the memory resource is configured to modify the current read pointer based on a determination of whether to allow data elements in the dedicated memory region to be read again.

The memory resource can be configured to fetch the one or more data elements based on a counter associated with the dedicated memory region, and modify the counter such that the one or more data elements will not be fetched again by a subsequent distributed read operation on the dedicated memory region. In some implementations, the memory resource can include a plurality of dedicated memory regions, and the destination address can include information to specify a specific one of the plurality of dedicated memory regions. In some implementations, the second packet can include two or more second packets, and the one or more data elements are distributed among the two or more second packets. In some implementations, the memory resource can include a distributed read queue to handle packets from the computing resources for the dedicated memory region.

In some implementations, the memory resource is configured to cause the one or more data elements to not be fetched again by a subsequent distributed read operation on the dedicated memory region, receive a third packet that indicates a distributed read operation, determine that the dedicated memory region is empty, and send an empty notification packet to a destination computing resource associated with the third packet based on the dedicated memory region being empty. In some implementations, the memory resource is configured to cause the one or more data elements to not be fetched again by a subsequent distributed read operation on the dedicated memory region; receive a third packet that indicates a distributed read operation; determine that the dedicated memory region is empty; and hold the third packet at the memory resource while the dedicated memory region is empty; and service the third packet when the dedicated memory region becomes non-empty.

A computing system can process distributed tasks such as image processing, geolocation, and string or packet searching. Such tasks may use large data sets and may require multiple packets to transfer data. For an image processing task, a memory can hold images which can be different sizes or the same size (e.g., 50×50 pixels). If each pixel is described by a set of 32-bit values, the overall size of each image can be many kilobytes. Since a packet size within the computing system can be limited, a transfer may require many packets to read one image out of memory. A DCR packet such as a "direct memory access" ("DMA") read packet, can include a 16-bit read size to read an image from a DCR memory region and produce a set of response packets that collectively contain the image. For geolocation based tasks, messages may include GPS location information, such as GPS coordinates, which can be geo-located within global regions. These messages can be read via DCR and processed as processing elements become available to handle the workload. For searching based tasks, strings or packets, such as Ethernet packets, can be searched against a dictionary of terms, and if these strings or packets have a fixed size, or are variable size but placed within fixed-size blocks of memory (e.g. variable length strings that are terminated with a NULL can be placed in fixed sized contiguous blocks of memory which are larger than the largest possible string). In some implementations, this memory can be placed in a DCR region, and the DMA reads can all read the same size, receiving and processing strings as they are able.

In the above description, numerous specific details have been set forth in order to provide a thorough understanding of the disclosed technologies. In other instances, well known structures, interfaces, and processes have not been shown in detail in order to avoid unnecessarily obscuring the disclosed technologies. However, it will be apparent to one of ordinary skill in the art that those specific details disclosed herein need not be used to practice the disclosed technologies and do not represent a limitation on the scope of the disclosed technologies, except as recited in the claims. It is intended that no part of this specification be construed to effect a disavowal of any part of the full scope of the disclosed technologies. Although certain embodiments of the present disclosure have been described, these embodiments likewise are not intended to limit the full scope of the disclosed technologies.

While specific embodiments and applications of the disclosed technologies have been illustrated and described, it is to be understood that the disclosed technologies are not limited to the precise configuration and components disclosed herein. The terms, descriptions and figures used herein are set forth by way of illustration only and are not meant as limitations. Various modifications, changes, and variations which will be apparent to those skilled in the art may be made in the arrangement, operation, and details of the apparatuses, methods and systems of the disclosed technologies disclosed herein without departing from the spirit and scope of the disclosed technologies. By way of non-limiting example, it will be understood that the block diagrams included herein are intended to show a selected subset of the components of each apparatus and system, and each pictured apparatus and system may include other components which are not shown on the drawings. Additionally, those with ordinary skill in the art will recognize that certain steps and functionalities described herein may be omitted or re-ordered without detracting from the scope or performance of the embodiments described herein.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application—such as by using any combination of hardware processors, e.g., microprocessors, microcontrollers, field programmable gate arrays (FPGAs), application specific integrated circuits (ASICs), and/or System on a Chip (SoC)—but such implementation decisions should not be interpreted as causing a departure from the scope of the disclosed technologies.

The steps of a method or algorithm described in connection with the embodiments disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art.

The methods disclosed herein comprise one or more steps or actions for achieving the described method. The method steps and/or actions may be interchanged with one another without departing from the scope of the disclosed technologies. In other words, unless a specific order of steps or actions is required for proper operation of the embodiment, the order and/or use of specific steps and/or actions may be modified without departing from the scope of the disclosed technologies.

What is claimed is:

1. A method comprising:
  maintaining, at a memory resource of a computer system, a dedicated memory region of the memory resource for distributed read operations requested by a plurality of computing resources of the computer system;
  generating, from a first computing resource of the plurality of computing resources, a first packet to fetch data from the memory resource, wherein the first packet lacks memory addresses of respective data elements stored within the dedicated memory region of the memory resource, wherein the first packet comprises (i) a destination address that comprises an identifier to route the first packet to the memory resource and (ii) an opcode that specifies an operation to be performed by the memory resource;
  sending the first packet from the first computing resource to the memory resource;
  receiving, at the memory resource, the first packet;
  determining, at the memory resource, whether the first packet indicates a distributed read operation, the determining comprising:
    extracting the opcode;
    determining whether the opcode indicates the distributed read operation or a nominal read operation;
    responsive to determining the first packet indicates the nominal read operation, determining, at the memory resource, whether a memory address portion of the destination address is associated with distributed read operations;
    responsive to determining the memory address portion of the destination address is not associated with distributed read operations, performing, at the memory resource, the nominal operation;
    responsive to determining the first packet indicates the distributed read operation, determining, at the memory resource, that the dedicated memory region is non-empty;
  fetching one or more data elements from the dedicated memory region based on the first packet indicating the distributed read operation and the dedicated memory region being non-empty; and
  sending, by the memory resource, a second packet that includes the one or more data elements.

2. The method of claim 1, wherein the memory resource comprises a first pointer, a second pointer, and a current read pointer, wherein the first pointer and the second pointer define an area of a memory structure that corresponds to the dedicated memory region, and wherein fetching the one or more data elements comprises:
  fetching the one or more data elements based on the first pointer, the second pointer, and the current read pointer; and
  advancing the current read pointer such that the one or more data elements will not be fetched again by a subsequent distributed read operation on the dedicated memory region.

3. The method of claim 2, wherein the memory resource comprises a third pointer, and wherein determining whether the dedicated memory region is non-empty comprises making a comparison based on the current read pointer and the third pointer.

4. The method of claim 2, comprising:
  modifying the current read pointer based on a determination of whether to allow data elements in the dedicated memory region to be read again.

5. The method of claim 1, wherein fetching the one or more data elements comprises:
  fetching the one or more data elements based on a counter associated with the dedicated memory region; and
  modifying the counter such that the one or more data elements will not be fetched again by a subsequent distributed read operation on the dedicated memory region.

6. The method of claim 1, wherein the memory resource comprises a plurality of dedicated memory regions, and wherein the destination address comprises information to specify a specific one of the plurality of dedicated memory regions.

7. The method of claim 1, wherein the first packet comprises a read size field and wherein fetching the one or more data elements is based on a value of the read size field.

8. The method of claim 1, comprising:
  causing the one or more data elements to not be fetched again by a subsequent distributed read operation on the dedicated memory region;
  receiving, at the memory resource, a third packet that indicates a distributed read operation;
  determining, at the memory resource, that the dedicated memory region is empty; and
  sending an empty notification packet to a destination computing resource associated with the third packet based on the dedicated memory region being empty.

9. The method of claim 1, comprising:
  causing the one or more data elements to not be fetched again by a subsequent distributed read operation on the dedicated memory region;
  receiving, at the memory resource, a third packet that indicates a distributed read operation;
  determining, at the memory resource, that the dedicated memory region is empty; and
  holding the third packet at the memory resource while the dedicated memory region is empty; and
  servicing the third packet when the dedicated memory region becomes non-empty.

10. A system comprising:
  computing resources; and
  a memory resource configured to maintain a dedicated memory region of the memory resource for distributed read operations requested by the computing resources,
  wherein the computing resources are configured to (i) generate a first packet to fetch data from the memory resource, wherein the first packet lacks memory addresses of respective data elements stored within the dedicated memory region of the memory resource, and (ii) send the first packet to the memory resource,
  wherein the first packet comprises (i) a destination address that comprises an identifier to route the first packet to the memory resource and (ii) an opcode that specifies an operation to be performed by the memory resource, and
  wherein the memory resource is configured to (i) receive the first packet, (ii) extract the opcode, (iii) determine whether the opcode indicates a distributed read operation or a nominal read operation, (iv) responsive to determining the opcode indicates a nominal read operation determine whether a memory address portion of the destination address is associated with distributed read operations, (v) responsive to determining the memory address portion of the destination address is not associated with distributed read operations, perform the nominal operation, (vi) responsive to determining the opcode indicates the distributed read operation, determine that the dedicated memory region is non-empty, (vii) fetch one or more data elements from the dedicated memory region based on the first packet indicating the distributed read operation and the dedicated memory region being non-empty, and (viii) send a second packet that includes the one or more data elements.

11. The system of claim 10, wherein the first packet comprises a read size field and wherein the memory resource is configured to fetch the one or more data elements based on a value of the read size field.

12. The system of claim 10, wherein the memory resource comprises a first pointer, a second pointer, and a current read pointer, wherein the first pointer and the second pointer define an area of a memory structure that corresponds to the dedicated memory region, and wherein the memory resource is configured to (i) fetch the one or more data elements based on the first pointer, the second pointer, and the current read pointer, and (ii) advance the current read pointer such that the one or more data elements will not be fetched against by a subsequent distributed read operation on the dedicated memory region.

13. The system of claim 12, wherein the memory resource comprises a third pointer, and wherein the memory resource is configured to determine whether the dedicated memory region is non-empty by making a comparison based on the current read pointer and the third pointer.

14. The system of claim 12, wherein the memory resource is configured to modify the current read pointer based on a determination of whether to allow data elements in the dedicated memory region to be read again.

15. The system of claim 10, wherein the memory resource is configured to:
fetch the one or more data elements based on a counter associated with the dedicated memory region, and
modify the counter such that the one or more data elements will not be fetched against by a subsequent distributed read operation on the dedicated memory region.

16. The system of claim 10, wherein the memory resource comprises a plurality of dedicated memory regions, and wherein the destination address comprises information to specify a specific one of the plurality of dedicated memory regions.

17. The system of claim 10, wherein the second packet comprises two of more second packets, and where the one or more data elements are distributed among the two or more second packets.

18. The system of claim 10, wherein the memory resource comprises a distributed read queue to handle packets from the computing resources for the dedicated memory region.

19. The system of claim 10, wherein the memory resource is configured to:
cause the one or more data elements to not be fetched again by a subsequent distributed read operation on the dedicated memory region,
receive a third packet that indicates a distributed read operation,
determine that the dedicated memory region is empty, and
send an empty notification packet to a destination computing resource associated with the third packet based on the dedicated memory region being empty.

20. The system of claim 10, wherein the memory resource is configured to:
cause the one or more data elements to not be fetched again by a subsequent distributed read operation on the dedicated memory region;
receive a third packet that indicates a distributed read operation;
determine that the dedicated memory region is empty; and
hold the third packet at the memory resource white the dedicated memory region is empty; and
service the third packet when the dedicated memory region becomes non-empty;
computing scaled frequency locations for each frame of the sequence of frames by dividing the frequency locations of the peaks for a frame by the pitch template for the frame; and
computing the scale factor using the scaled frequency locations.

* * * * *

UNITED STATES PATENT AND TRADEMARK OFFICE
CERTIFICATE OF CORRECTION

| | | |
|---|---|---|
| PATENT NO. | : 10,346,049 B2 | Page 1 of 1 |
| APPLICATION NO. | : 15/143215 | |
| DATED | : July 9, 2019 | |
| INVENTOR(S) | : Andrew White et al. | |

It is certified that error appears in the above-identified patent and that said Letters Patent is hereby corrected as shown below:

In the Claims

Column 28, Line 36, rewrite as follows:
-- hold the third packet at the memory resource while the --

Column 28, Line 39, rewrite as follows:
-- region becomes non-empty. --

Column 28, Line 40-45, cancel in their entirety

Signed and Sealed this
Tenth Day of September, 2019

Andrei Iancu
*Director of the United States Patent and Trademark Office*